(12) United States Patent  
Seki et al.

(10) Patent No.: US 8,339,016 B2  
(45) Date of Patent: Dec. 25, 2012

(54) VIBRATION WAVE DRIVING DEVICE

(75) Inventors: Hiroyuki Seki, Oyama (JP); Takayuki Tsukimoto, Fujisawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 12/950,198

(22) Filed: Nov. 19, 2010

(65) Prior Publication Data

US 2011/0062823 A1    Mar. 17, 2011

Related U.S. Application Data

(62) Division of application No. 12/551,079, filed on Aug. 31, 2009, now Pat. No. 7,969,065.

(30) Foreign Application Priority Data

Sep. 9, 2008  (JP) ................................. 2008-230891  
Dec. 27, 2008  (JP) ................................. 2008-335545

(51) Int. Cl.  
*H01L 41/08* (2006.01)

(52) U.S. Cl. ............................... 310/323.02; 310/323.04

(58) Field of Classification Search ............ 310/323.02, 310/323.03, 323.04, 323.05  
See application file for complete search history.

(56) References Cited

U.S. PATENT DOCUMENTS

| | | | |
|---|---|---|---|
| 4,649,311 A | 3/1987 | Mukohjima et al. | |
| 5,017,823 A | 5/1991 | Okumura | |
| 5,036,245 A | 7/1991 | Ohnishi et al. | |
| 6,242,846 B1 | 6/2001 | Ashizawa et al. | |
| 7,215,062 B1 | 5/2007 | Iino et al. | |
| 7,425,770 B2 | 9/2008 | Suzuki | |
| 7,432,633 B2 | 10/2008 | Sakano | |
| 7,696,670 B2 * | 4/2010 | Sakamoto | 310/323.09 |
| 7,732,981 B2 * | 6/2010 | Lim et al. | 310/323.11 |
| 7,944,119 B2 * | 5/2011 | Nagaoka | 310/323.02 |
| 7,969,065 B2 * | 6/2011 | Seki et al. | 310/323.02 |
| 2001/0013740 A1 * | 8/2001 | Fukui et al. | 310/323.04 |
| 2005/0082947 A1 | 4/2005 | Li et al. | |
| 2005/0082950 A1 | 4/2005 | Zakoji | |
| 2005/0258711 A1 | 11/2005 | Funakubo | |
| 2007/0188050 A1 * | 8/2007 | Hashimoto | 310/323.02 |
| 2007/0290576 A1 | 12/2007 | Johansson et al. | |

(Continued)

FOREIGN PATENT DOCUMENTS

JP    2000-060163 A    2/2000

(Continued)

OTHER PUBLICATIONS

Communication dated May 11, 2012, forwarding a European Search Report dated May 2, 2012, in European Application No. 10172019.1.2222/2242123.

*Primary Examiner* — Mark Budd  
(74) *Attorney, Agent, or Firm* — Fitzpatrick, Cella, Harper & Scinto

(57) ABSTRACT

A vibration wave driving device comprises a vibrator having an electromechanical conversion device, a supporting member for supporting the vibrator, and a driven member brought into contact with a part of the vibrator driven frictionally by vibration excited in the vibrator: the supporting member comprising a vibration portion vibrating together with the vibrator, a fixation portion for fixing the supporting member, and a support portion for connecting the vibration portion with the fixation portion and supporting the vibrator; and the support portion being comprised of a laminate of sheets.

8 Claims, 21 Drawing Sheets

U.S. PATENT DOCUMENTS

| | | |
|---|---|---|
| 2008/0192584 A1 | 8/2008 | Yamazaki |
| 2009/0026884 A1 | 1/2009 | Adachi et al. |
| 2009/0072665 A1 | 3/2009 | Adachi et al. |

FOREIGN PATENT DOCUMENTS

| | | |
|---|---|---|
| JP | 2001-268949 A | 9/2001 |
| JP | 2006-211839 A | 8/2006 |
| JP | 2006-271143 A | 10/2006 |
| JP | 2006-340443 A | 12/2006 |
| WO | 90/10313 A1 | 9/1990 |
| WO | 2005/018081 A1 | 2/2005 |
| WO | 2007-069682 A1 | 6/2007 |

* cited by examiner

VIBRATION WAVE DRIVING DEVICE

This is a division of U.S. patent application Ser. No. 12/551,079, filed Aug. 31, 2009.

BACKGROUND OF THE INVENTION

1. Field of the Invention

The present invention relates to a vibration wave driving device (typically, a vibration wave motor). In particular, the present invention relates to a vibration wave motor which is characterized by its supporting structure.

The present invention relates also to a structure of a vibration wave driving device, in particular to a structure which does not cause creak or a like noise.

2. Related Background Art

Various types of vibration wave driving devices, typically ultrasonic motors (vibration wave motors) are known, including rotary types and linear types.

The vibration wave driving device comprises, as basic structural elements, an elastic member constituting a vibrator, an electromechanical conversion device (or a magneto-stricting element), a supporter for supporting the vibrator, a driven member driven frictionally by contact with a part of the vibrator, a pressure-applying unit, and a bearing guide.

FIGS. 8A and 8B illustrate a constitution of a conventional linear type vibration wave motor (U.S. Pat. No. 7,432,633). FIG. 8A is a front view and FIG. 8B is a side view thereof.

Piezo-electric element 15 in a horizontally long rectangular shape is held by holder 19, energized by blade spring 20 toward driven member 17, and brought into contact with driven member 17 by driving contacts 16.

Holder 19 has side walls 22 for holding piezo-electric element 15 in the Y-direction, holder base 23, and pin 18 in a cylindrical shape projecting in the Y-direction from side wall 22.

Pin 18, which is nearly circular cylindrical, supports piezo-electric element 15 to be rotatable around pin 18 to follow smoothly the movement of driven member 17.

On application of an alternate electric field to piezoelectric element 15 by a power source and a power applying means not shown in the drawing, the vibrator containing piezo-electric element 15 is excited in a bending oscillation mode in the X-Z plane, and in a stretching mode in the X-direction simultaneously to move drive contacts 16 in an ellipsoidal movement. As the result, driven member 17 in contact with driving contact 16 is driven by blade spring 20 frictionally in the X-direction.

In the above conventional vibration wave motor, although the linear bearing guide is not shown in the drawing, with the parts upper from piezo-electric element 15 (members 15-23) fixed, the driven member 17 is guided to move only in the X-direction (in the direction of the driving force).

Such a driving system employing a linear type vibration wave motor is advantageous in that the construction is simple in comparison with the conventional driving system which converts the rotational movement of an electromagnetic motor into linear movement, and that the positioning accuracy can be improved by direct driving.

U.S. Pat. No. 7,425,770 discloses a linear type of vibration wave motor employing a magnetic force for pressure application.

Various types of ultrasonic motors are known, including rotary type ones and linear type ones.

The ultrasonic motors are classified roughly by the driving principle into stationary wave type ones and progressive wave type ones. The stationary wave type vibrator forms a stationary wave as a driving vibration mode by superposition of a bending vibration and a stretching vibration excited simultaneously. On the other hand, the progressive type vibrator forms similarly a progressive wave by superposition of a plurality of stationary wave vibrations.

Japanese Patent Application Laid-Open No. 2006-271143 discloses a progressive wave type of ultrasonic motor having the structure illustrated in FIG. 22.

In FIG. 22, the ultrasonic motor comprises vibrator 101 having piezo-electric member 102 and an elastic member 103, and moving member 105 in pressure contact with the driving face of elastic member 103. Flange 103c at the inner periphery of vibrator 101 is held and fixed between supporting members 106a, 106b to enable driving of moving member 105.

Moving member 105 is joined to shaft 108 with interposition of buffering member 107 like a rubber, and pressure spring 109 and output gear 110 fixed to shaft 108 apply a pressure to the frictional face between moving member 105 and vibrator 101.

The ultrasonic motor having such a structure is capable of outputting a larger torque at a lower speed with generation of less noise.

Japanese Patent Application Laid-Open No. 2001-268949 discloses an ultrasonic motor which has disk-shaped vibrator 113 supported at the center by support member 114 as illustrated in FIG. 23.

In this ultrasonic motor, the vibrator 113 is comprised of a combination of elastic member 111 and piezo-electric element 112, and vibrates in a vibration mode of primary vibration in the radial direction, in which the center of the disk becomes the center of the vibration and the outermost periphery of the disk becomes the loop. Therefore in this constitution, the node of the vibration, namely the center of the disk, is fixed not to prevent the vibration of the vibrator.

(Patent Document 1) JP-A 2006-211839; U.S. Pat. No. 7,432,633

(Patent Document 2) JP-A 2006-340443; U.S. Pat. No. 7,425,770

(Patent Document 3) JP-A 2006-271143

(Patent Document 4) JP-A 2001-268949

In the aforementioned U.S. Pat. No. 7,432,633, the support portion is comprised of pin 18, holding member 19 engaging with the pin to control the position and direction of the vibrator, and blade spring 20. The vibrator is pressed against driven member 17, whereby the position and the direction of the vibrator are controlled. This results in a larger thickness of the device, and is not suitable for miniaturization of the entire motor.

This structure contains no damping member within the combination of the vibrator, holding member, and blade spring. Therefore, a slight leakage of vibration of the vibrator or an undesired vibration transmitted from the friction part during the driving tends to cause an abnormal noise like a creak disadvantageously.

The above-mentioned conventional ultrasonic motors have problems as below.

In the ultrasonic motor described in Japanese Patent Application Laid-Open No. 2006-271143, the vibration member is made of a less-damping material owing to the characteristic driving principle of utilizing the vibration and friction. Further, the friction material is selected which has a high frictional coefficient, which tends to cause undesired vibration and noises.

Such phenomena become remarkable in cost down of the vibrator or the moving member owing to lowering of the face precision of the sliding face.

This prevents simultaneous achievement of improvement of the function such as the low noise and the low cost.

To overcome the above disadvantages, a damping rubber is attached on the back face of the vibrator (on the joint face to a flexible substrate). However, the damping rubber damps simultaneously the driving vibration of the vibrator to lower the motor efficiency disadvantageously.

Further, the ultrasonic motor disclosed in the above Japanese Patent Application Laid-Open No. 2001-268949 has also shortcomings of occurrence of creak or a like noise by stick slippage at a sliding portion, or a like cause.

To solve the above problems, the present invention intends to provide a vibration wave driving device having a simplified and thinned supporting structure to miniaturize the device and to lower the production cost.

The present invention intends also a vibration wave driving device which damps effectively undesired vibration excited in the sliding face without damping the driving vibration of the vibrator and prevents occurrence of creak or a like noise.

SUMMARY OF THE INVENTION

The present invention is directed to a vibration wave driving device comprising a vibrator having an electromechanical conversion device, a supporting member for supporting the vibrator, and a driven member brought into contact with a part of the vibrator driven frictionally by vibration excited in the vibrator:

the supporting member comprising a vibration portion vibrating together with the vibrator, a fixation portion for fixing the supporting member, and a support portion for connecting the vibration portion with the fixation portion and supporting the vibrator; and the support portion being comprised of a laminate of sheets.

The sheet comprising the support portion can be comprised of an organic material, and, the support portion is further comprised of a reinforcing member having an elastic modulus higher than that of the laminate.

The laminate can be comprised of a resin.

The reinforcing member can be comprised of a copper type leading material.

The supporting member can be a flexible printed substrate connected to the electro-mechanical energy converting element.

The reinforcing member can be provided at a point of a node of a vibration for frictional driving of the driven member and simultaneously of a loop of an undesired vibration different from the useful vibration.

The present invention is directed to a vibration wave driving device having a vibrator constituted at least of a piezoelectric element and a contact member capable of causing an ellipsoidal movement by synthesis from stationary wave vibrations, and a supporting member for supporting the vibrator, for driving a driven member in contact with the contact member of the vibrator by ellipsoidal movement of the vibrator:

wherein the vibration wave driving device has a vibration-preventing member attached to a node other than a support portion of the vibrator among the common nodes of a nodal circle or a nodal line of the plural stationary wave vibrations excited in the vibrator.

The vibration-preventing member can be comprised of a vibration-damping member.

The vibration-damping member can have a shape for nearly point contact with the vibrator.

The portion of the vibration-damping member in contact with the vibrator can have a shape of hemisphere or circular cone.

The vibration-damping member can be comprised of an elastic rubber or an elastomer having a high damping property.

The vibration-preventing member can be comprised of a pressure-applying unit for pressure contact between the vibrator and the driven member.

The vibration-preventing member can be comprised of a transmission member for transmitting the driving force generated between the vibrator and the driven member.

According to the present invention, the vibration wave motor can be miniaturized and produced at a lower cost by simplifying and thinning the support structure of the vibrator.

According to the present invention, a vibration wave driving device can be produced which damps undesired vibration in vibrator to prevent generation of creak or a like noise without adverse effect on the driving vibration mode in the vibrator without lowering the motor efficiency.

Further features of the present invention will become apparent from the following description of exemplary embodiments with reference to the attached drawings.

DETAILED DESCRIPTION OF THE INVENTION

The first constitution of the present invention is described below in detail with reference to drawings.

First Embodiment

Figure 1:
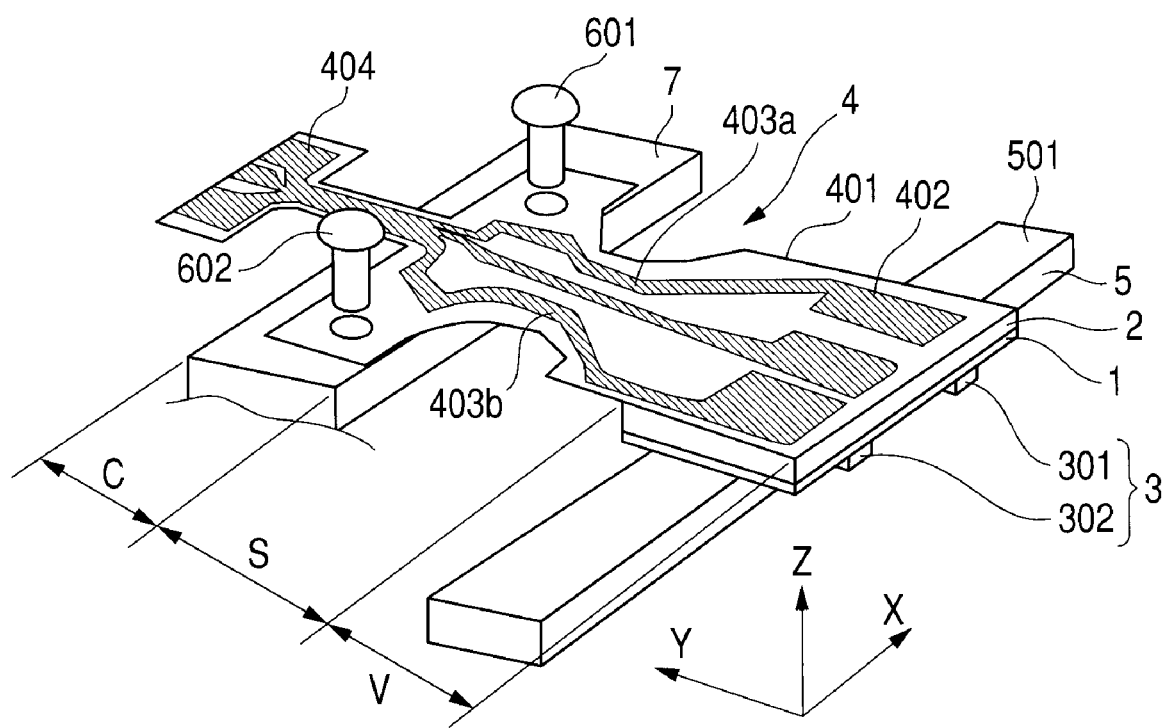
FIG. 1 is a perspective view of the vibration wave motor of First Embodiment of the present invention.
Figure 2:
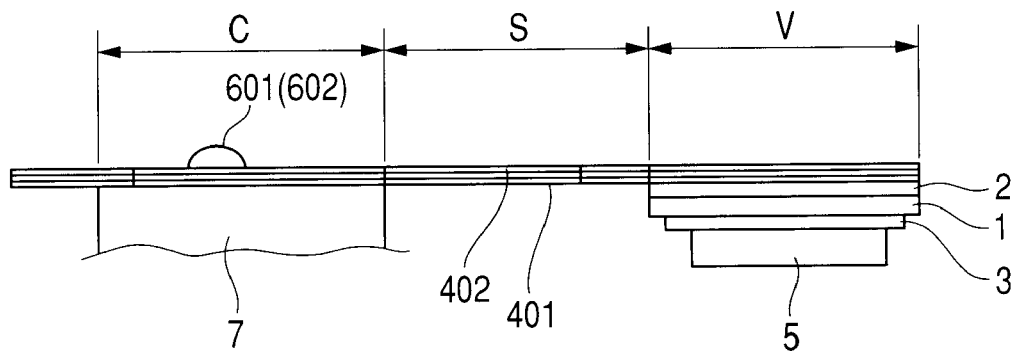
FIG. 2 is a sectional view of the vibration wave motor illustrated in FIG. 1.

FIG. 1 is a perspective view of the vibration wave motor of First Embodiment of the present invention. FIG. 2 is a sectional view of the vibration wave motor illustrated in FIG. 1.

In FIGS. 1 and 2, piezo-electric element 2 as an electro-mechanical energy converting element is joined to rectangular elastic member 1 made of a soft magnetic material like iron. Onto the other face of piezo-electric element 2, is joined a flexile printed substrate 4 (hereinafter referred to as a flexile substrate) having base 401 made of a resin (e.g., a polyimide film). Elastic member 1 and piezo-electric element 2 constitute the vibrator.

Elastic member 1 has protrusions 301, 302 on one face thereof. These protrusions are brought into contact with contact face 501 of driven member 5 to drive the driven member 5 by a frictional driving force.

This driven member 5 is comprised of a permanent magnet having an N-pole (or S-pole) on the contact face side and an S-pole (or N-pole) on the reverse face. Thereby an attracting force and a pressing force are produced toward elastic member 1 and protrusions 3 (301, 302).

Flexible substrate 4 is comprised of the aforementioned base 401, electrodes 402 to be connected to an electrode terminal of piezoelectric element 2, connector 404 for electric connection with an outside power supply (not shown in the drawing), electric conductors 403a and 403b for electric connection between the electrodes and the connectors.

Flexible substrate 4 in this Embodiment is fixed to casing 7 by screws 6 (601, 602) at the fixing portion between connector 404 and electrodes 402 to fix the vibrator.

On application of an alternate electric field to flexible substrate 4 from a power source not shown in the drawing, a vibrator is excited to vibrate to cause ellipsoidal movement of protrusions 301, 302 to drive frictionally driven member 5 in the X-axis direction.

In the above constitution, flexible substrate 4 supplies the power to piezo-electric element 2, and supports the vibrator.

This flexible substrate 4 is comprised of three portions as follows: a vibration portion V which is joined to piezo-electric element 2 and vibrates together with piezo-electric element 2; a fixation portion C which fixes this flexible substrate 4 to a casing; and a support portion S which is placed between vibration portion V and fixation portion C, joins these two portions, and supports piezo-electric element 2 (vibrator), (FIG. 1).

Of the above three portions, support portions S is important in the present invention. This support portion S defines the position relative to driven member 5 at the initial assemblage, and holds the vibrator at the prescribed position and direction against an external force such as a reaction force to the driving force or an inertial force at the movement reversal.

Further, the support portion S should be flexible to keep piezo-electric element 2 to be in stable contact with driven member 5 regardless of waving of contact face 501.

To meet the above requirements, support portion S is constituted to make smaller the rotation rigidity around the X-axis and the direction-change rigidity in the Z-axis direction, and to increase the rigidity in the X-Y plane.

For the purpose, conductors 403a and 403b (copper foils in this Embodiment) formed on the sheet-shaped base 401 is utilized for reinforcement in such a manner that the conductors 403a and 403b of support portion S extend outward in the breadth direction. Thereby the rigidity of the flexible substrate, which is a thin film sheet, is increased within the X-Y plane.

Further, support portion S is covered with a film or films to form a lamination structure to damp, by slip at the interface, an undesired vibration transmitted through flexible substrate 4.

This prevents usual generation of a noise caused by vibration of flexible substrate 4, and prevents also amplification of the noise by transmission of the leaked vibration from the vibrator to the casing, and adverse effect given to the sensor or a like part.

In conventional vibration wave motors, the supporting member for transmitting the driving force is constructed from a rigid material such as a metal, which makes larger the size of the part and makes the motor structure complicated. In contrast, in the vibration wave motor of this Embodiment, piezo-electric element 2 constituting the vibrator is supported by a sheet (the support portion S of flexible substrate 4) to simplify the motor construction and to miniaturize the vibration motor.

Second Embodiment

Figure 3:
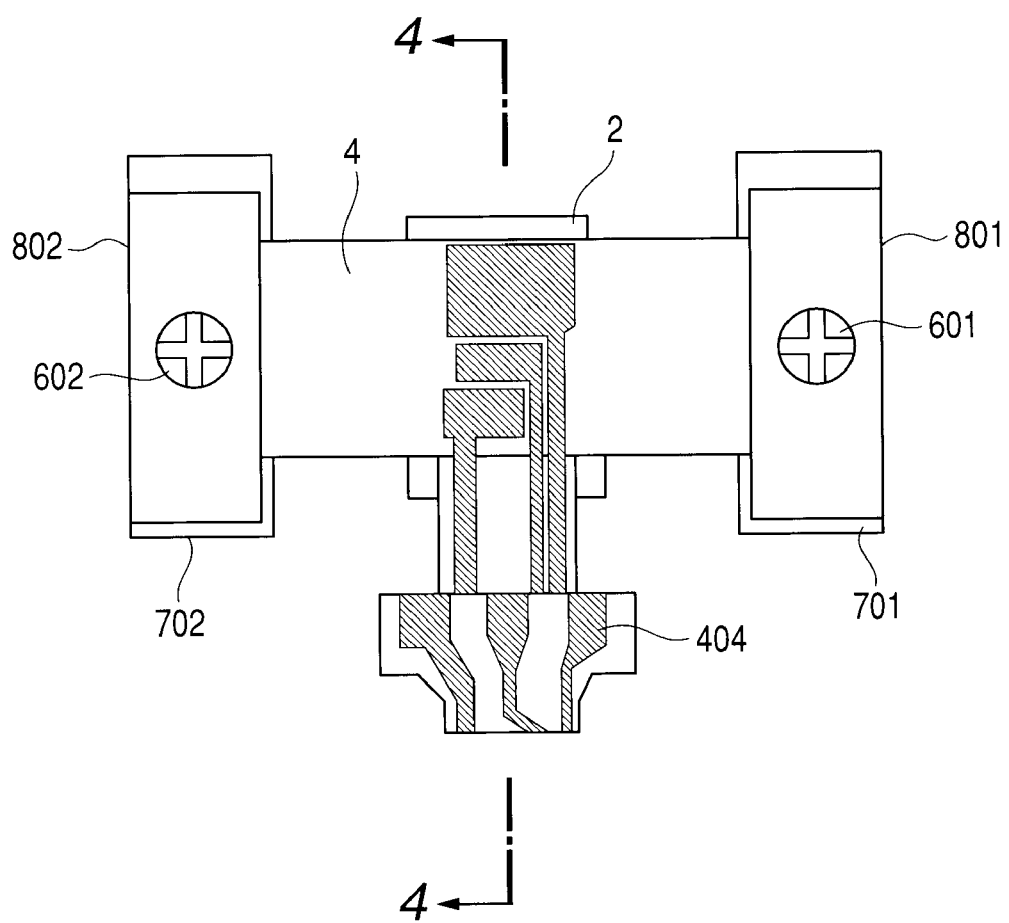
FIG. 3 illustrates a constitution of the main portion of the vibration wave motor of Second Embodiment of the present invention.

FIG. 3 illustrates a constitution of the vibrator portion as the main portion of the vibration wave motor of Second Embodiment of the present invention.

In this Embodiment, flexible substrate 4 extends toward the both sides (Y-direction) and the X-direction of the vibrator, and the supporting function is given to the both sides in the Y-direction. Power is supplied through the portion extending in the X direction.

In this Embodiment, flexible substrate 4 is fixed at the both sides of flexible substrate 4 by screws 6, and is fixed to casing 7 (701, 702) by pressing with pressing plate 8 (801, 802) to prevent displacement of the vibrator in the X-Y plane.

Figure 4:
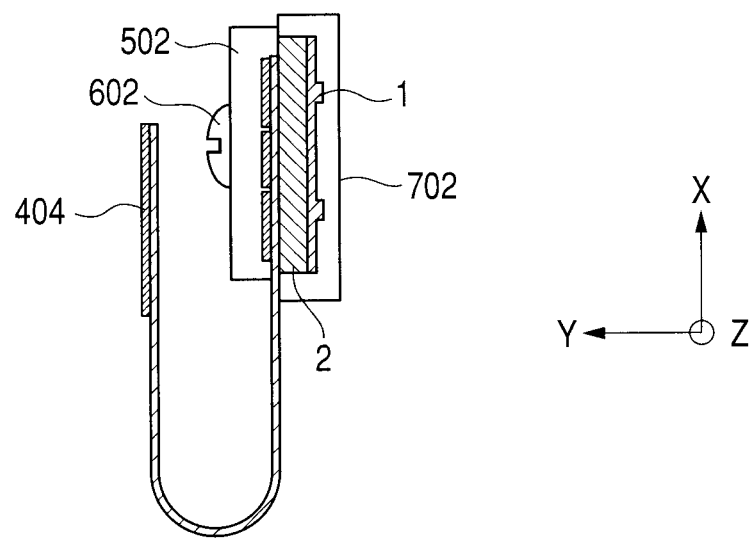
FIG. 4 is a sectional view of the main portion of the vibration wave motor of FIG. 3, taken along the line 4-4.

FIG. 4 is a sectional view of the main portion of the vibration wave motor of FIG. 3, taken along line 4-4.

As illustrated in FIG. 4, connector 404 is allowed to extend in the X direction, and then is curled for connection to a power source not shown in the drawing. The connector 404 and the surrounding portion are fixed to the casing or the like.

Thereby, connector 404 comprised of plural layers functions as a damper to intercept effectively an undesired vibration transmitted from piezo-electric element 2 constituting the vibrator to flexible substrate 4.

Third Embodiment

Figure 5:
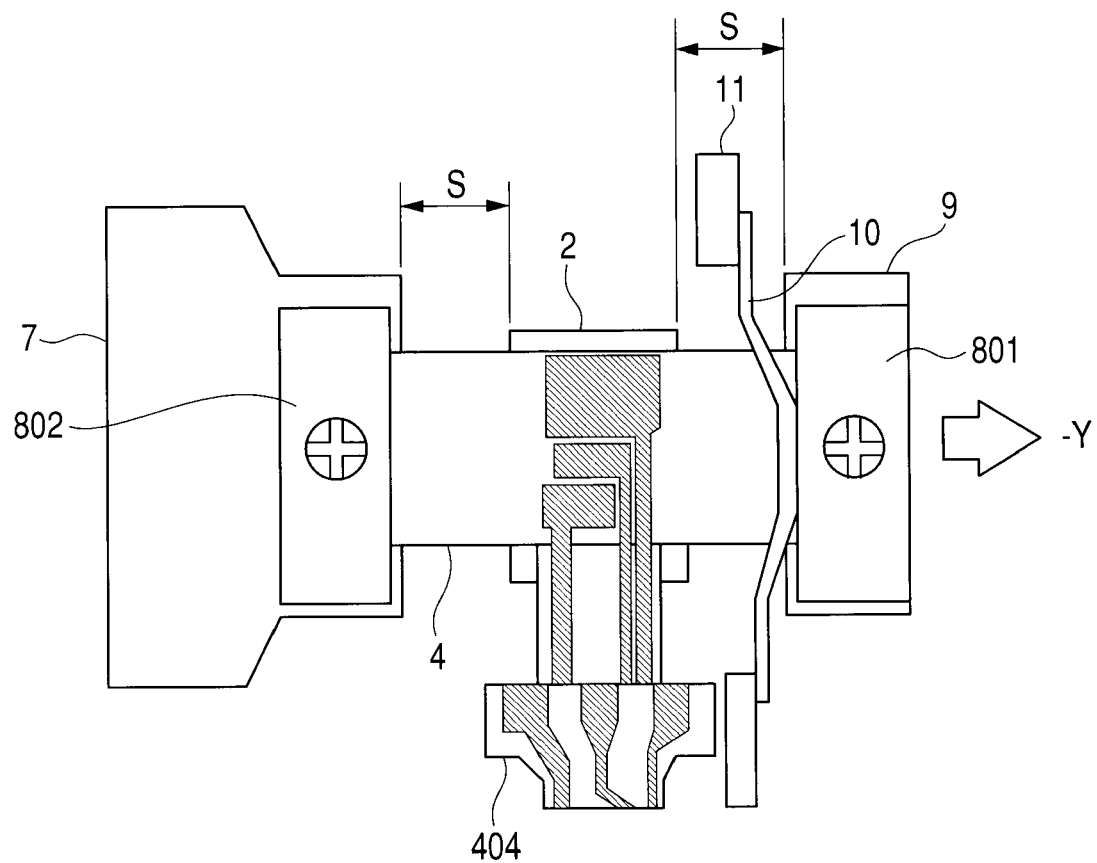
FIG. 5 illustrates a constitution of the main portion of the vibration wave motor of Third Embodiment of the present invention.

FIG. 5 illustrates a constitution of the vibrator portion as the main portion of the vibration wave motor of Third Embodiment of the present invention.

In this Embodiment, one side of the casing in Second Embodiment is made movable, and a tension is applied to flexible substrate 4.

One casing 7 is fixed, and the other casing 9 is made movable. Casing 9 has spring bearing 11 for bearing blade spring 10. A spring force is applied by blade spring 10 to the fixation portion C of flexible substrate 4 held between pressing plate 8 and casing 9 in the −Y direction. Thereby a tension is applied to support portion S of flexible substrate 4 in the Y direction.

This enables increase of the rigidity of thin sheet-shaped support portion S in the X-Y plane, and the vibrator can be supported stably.

Fourth Embodiment

Figure 6:
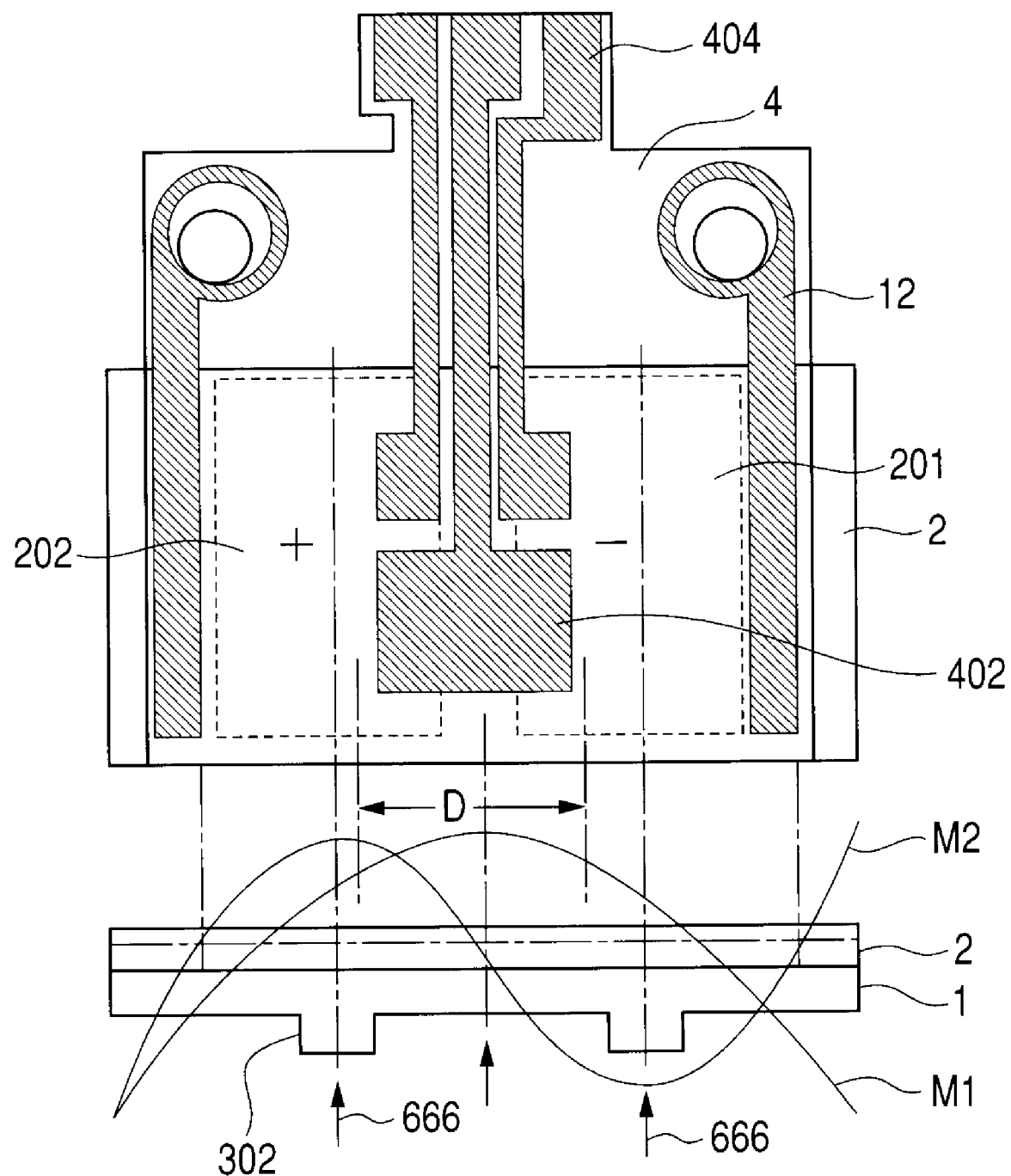
FIG. 6 illustrates a constitution of the main portion of the vibration wave motor of Fourth Embodiment of the present invention.

FIG. 6 illustrates a constitution of the vibrator portion as the main portion of the vibration wave motor of Fourth Embodiment of the present invention.

In the above Embodiments, a noise generation is prevented by damping the vibration by a lamination layer structure of the sheet in support portion (support portion S of flexible substrate 4) of the vibrator. In this Embodiment, further the lamination pattern of the sheets in the vibration portion is improved to damp the undesired vibration of the vibrator.

The vibrator is comprised of piezo-electric element 2, elastic member 1 having protrusions 301, 302, and flexible substrate 4. The vibrator, when driven, excites vibration in ellipsoidal movement by synthesis of the second-order mode movement of out-of-plane bending and the first-order mode movement of stretching.

In the second-order mode as the driving mode, the vibration is deformed to have three nodes as illustrated at the lower part of FIG. 6 (M2). The electrode pattern of piezo-electric element 2 for exciting this second-order mode is preferably formed, as well known, to have the center of the electrode at the center of the loop of the vibration (arrow mark 666) as shown by a broken line in the drawing.

In the drawing, the symbols "+" and "−" indicate the direction of the polarization in the thickness direction of the piezo-electric element.

On the other hand, in the vibrator of this Embodiment, one of the undesired vibrations which are liable to be excited by frictional driving is a first-order mode vibration of out-of-plane bending. A deformation in this mode is, as indicated by symbol M1, at the lower part in FIG. 6, has a loop of the vibration corresponding to the center of the piezo-electric element 2. The position of this portion is effective in excitation of the vibration as well as in damping of the vibration.

This portion corresponds to the node of vibration of the driving mode, and is less influential.

Therefore, in this Embodiment, an electro-conductive member formed from a copper foil or the like is laminated at or near the center of piezo-electric element 2 to form the electrode, and a leading member is placed from this electrode toward support portion S of flexible substrate 4, and a lamination portion is formed at or near the center in the breadth direction of the support portion S.

As described above, even if the vibrator is excited in a first-order mode of out-of-plane bending, the laminated vibration portion and support portion S selectively damp this mode of vibration to prevent generation of a noise, being different from conventional vibrators.

Incidentally, in this Embodiment, reinforcing members 12 are placed at the both end faces to reinforce support portion S of flexible substrate 4, which simultaneously improves the damping effect by support portion S.

Fifth Embodiment

Figure 7:
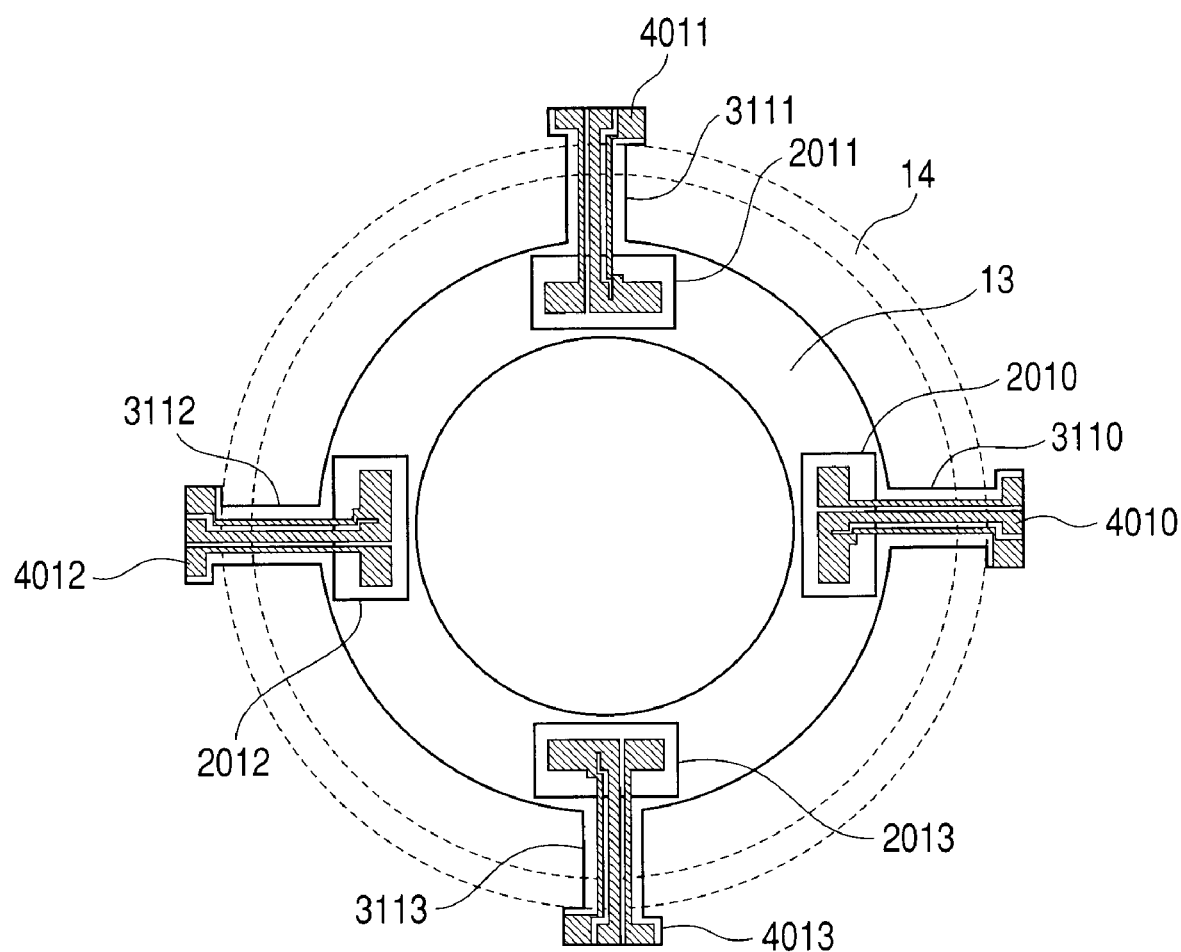
FIG. 7 illustrates a constitution of the main portion of the vibration wave motor of Fifth Embodiment of the present invention.
Figure 8A:
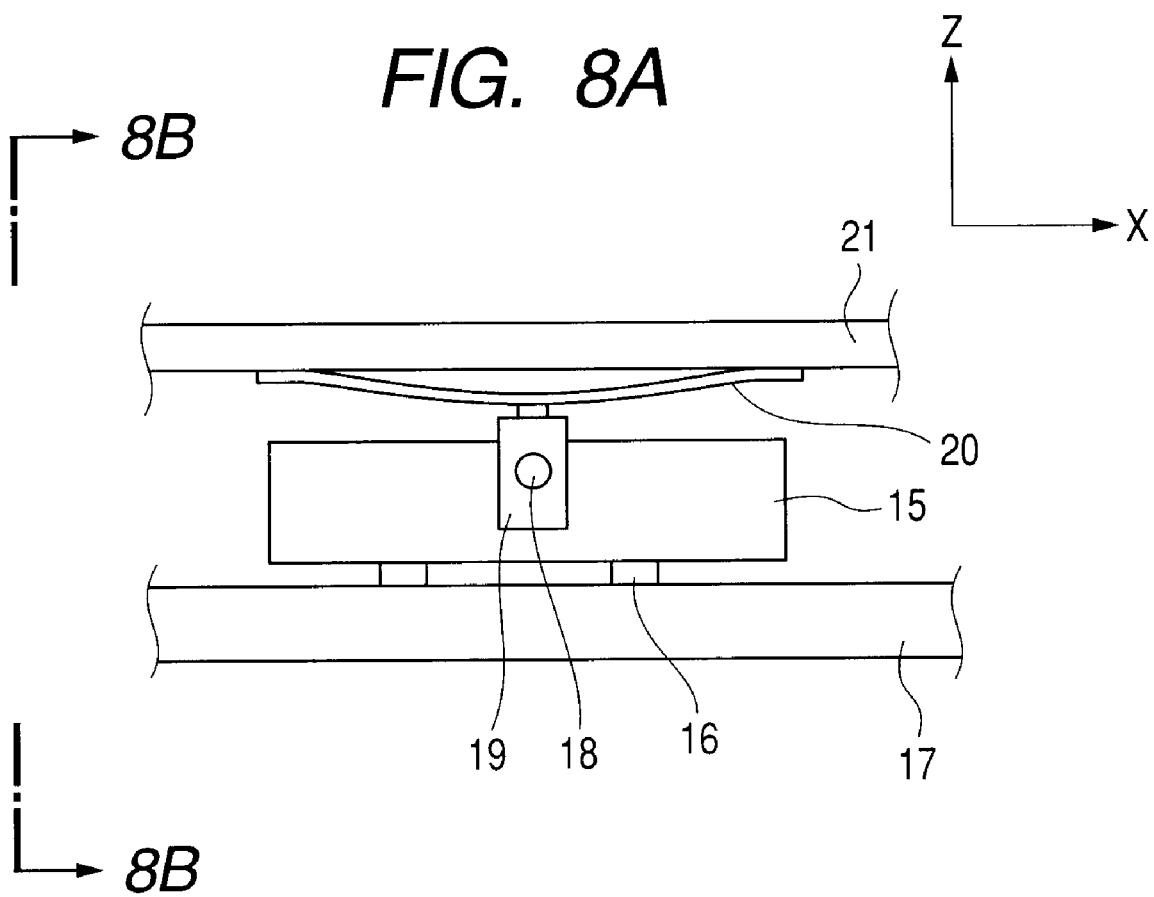
FIGS. 8A and 8B illustrate a constitution of a conventional linear type of vibration wave motor.
Figure 8B:
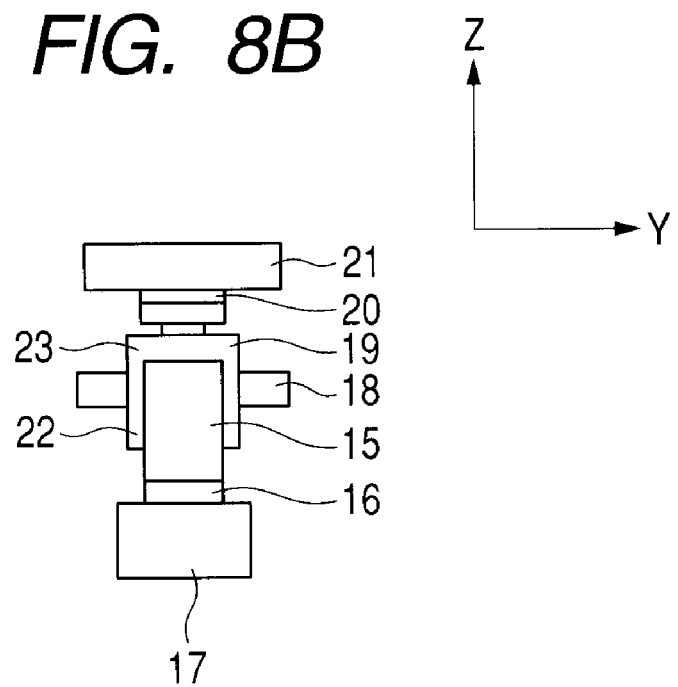

FIG. 7 illustrates a constitution of the vibrator portion as the main portion of the vibration wave motor of Fifth Embodiment of the present invention.

In this Embodiment, a plurality of vibrators is placed on one sheet to simplify the structure of multiple vibrator driving.

Piezo-electric elements 2010-2013 are bonded by an adhesive or the like onto a ring-shaped resin sheet 13, and electrodes comprised of an electro-conductive material like a copper foil and parts of the leading members are bonded between sheet 13 and piezo-electric elements 2010-2013.

The leading members formed from an electro-conductive material extend respectively radially to form support portions by joining by an adhesive or the like to the four narrow sheet portions 3110-3113 formed in integration with sheet 13 to form the support portions and further extend outward to form connection terminals 4010-4013.

Parts of the support portions extending radially are fixed to the casing or a part of the main body by holding between ring-shaped fixation members 14 to support the four vibrators at the intended positions.

With the simple structure as described above, a plurality of vibration wave motors can be driven.

As described above, the construction of the support portions can be simplified for miniaturization by constituting the support portions of the vibrators from lamination of thin sheets, and can reduce noise generation by utilizing positively the vibration damping effect by the laminate.

In the above Embodiment, a sheet of polyimide is comprised in the flexible substrate. However, any organic thin film may be used as the sheet. A copper type leading material is employed as the reinforcing material in the above Embodiment. However the same reinforcing effect can be achieved by laminating sheets of a resin having an elastic modulus higher than the flexible substrate.

A second constitution of the present invention is described in detail with reference to drawings. The stationary wave excited by the vibration member like a piezo-electric element has a node having a nodal circle or a nodal line. The common point of intersection of the nodal circles or the nodal lines is called a nodal point.

In the constitution of the present invention, the vibration-damping member is brought into contact with the nodal point other than the node of the support portion of the vibrator.

The best mode for carrying out the present invention is described with reference to Examples.

EXAMPLES

The present invention is described with reference to Examples without limiting the present invention in any way.

Example 1

This Example 1 describes a constitution of a linear type ultrasonic motor employing a vibration wave driving device comprising a vibrator for forming an ellipsoidal movement by synthesis of a plurality of stationary waves and a supporting member for supporting the vibrator.

Figure 9A:
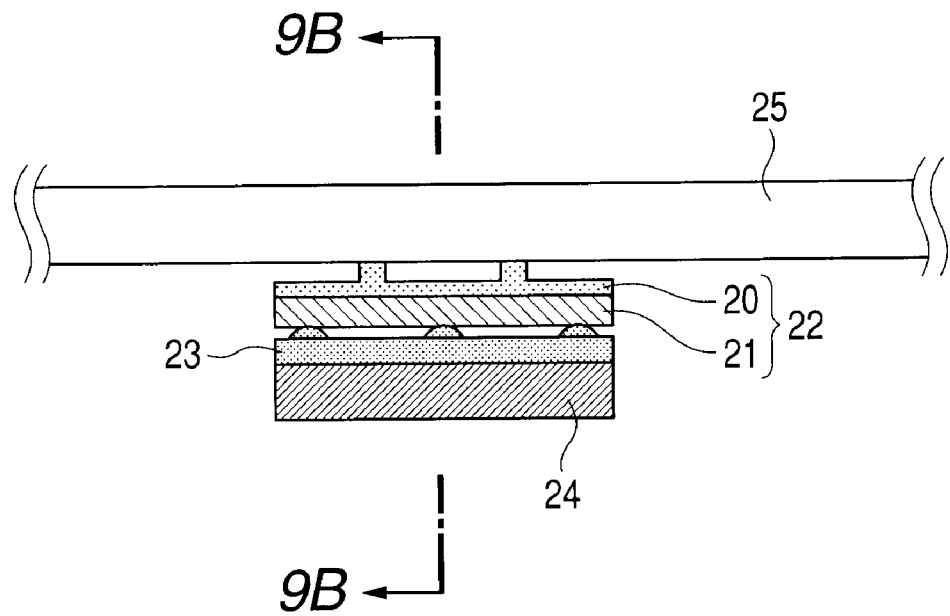
FIGS. 9A and 9B are sectional views for describing the constitution of the ultrasonic motor of Example 1 of the present invention.
Figure 9B:
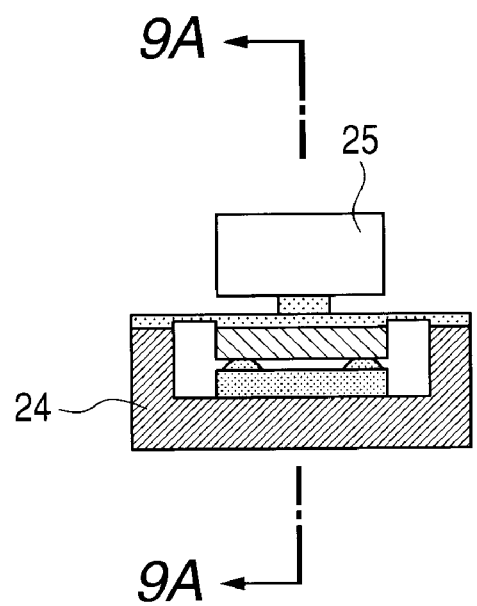

FIGS. 9A and 9B are sectional views for describing the constitution of the ultrasonic motor of this Example 1. In FIGS. 9A and 9B, the reference numerals denote the followings: 20, a vibration plate; 21, a piezo-electric element; 22, a vibrator; 23, a vibration-damper; 24, a holder (supporting member); 25, a driven member (slider).

Figure 10:
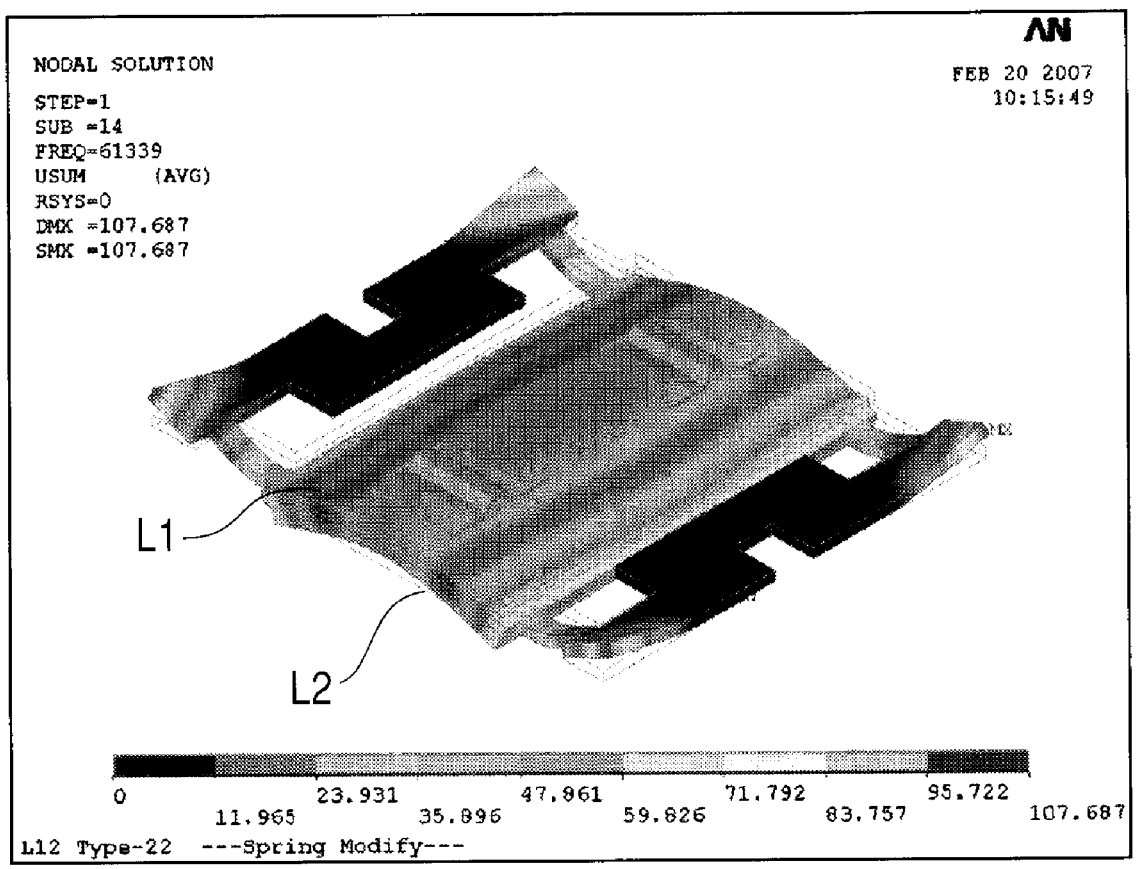
FIG. 10 is a drawing for describing the vibration mode of the ultrasonic motor of Example 1 of the present invention.
Figure 11:
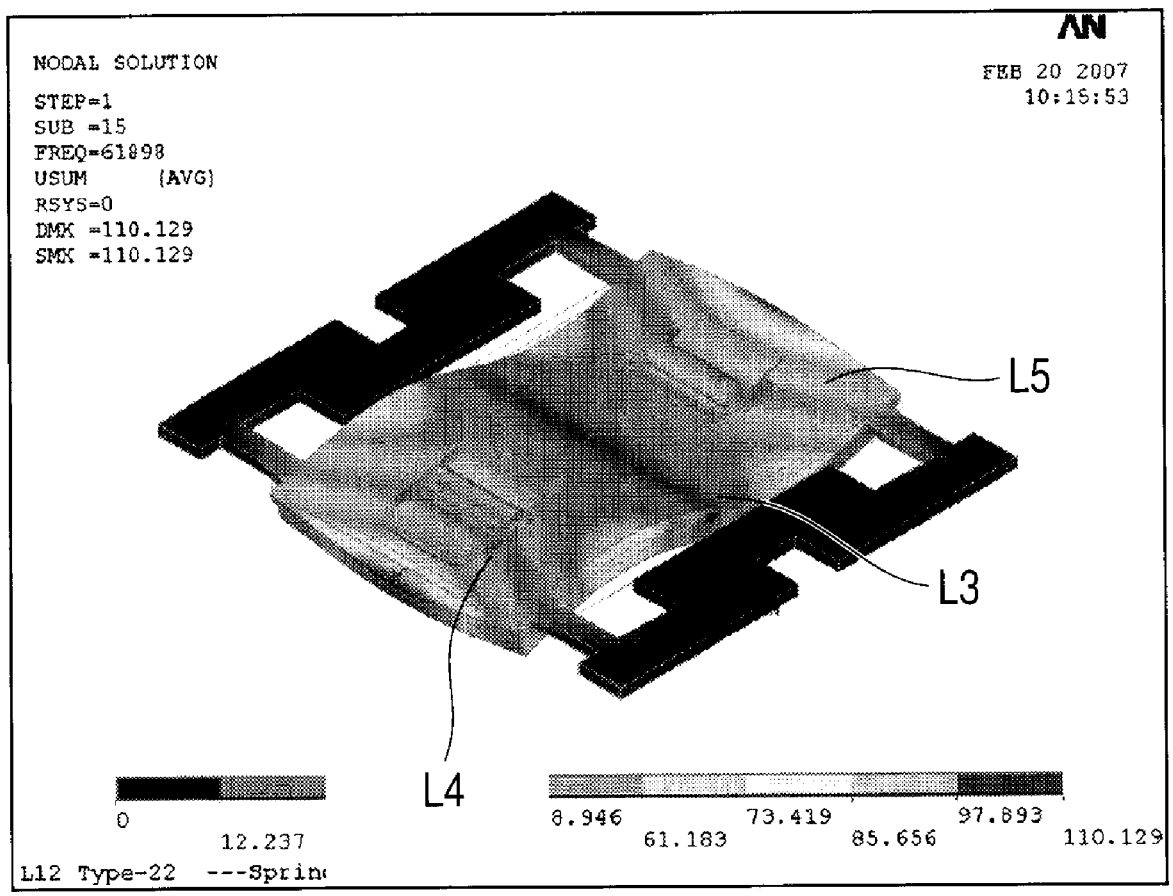
FIG. 11 is a drawing for describing the vibration mode of the ultrasonic motor of Example 1 of the present invention.

FIGS. 10 and 11 are respectively a drawing for describing the vibration mode of the ultrasonic motor of this Example 1.

Figure 12:
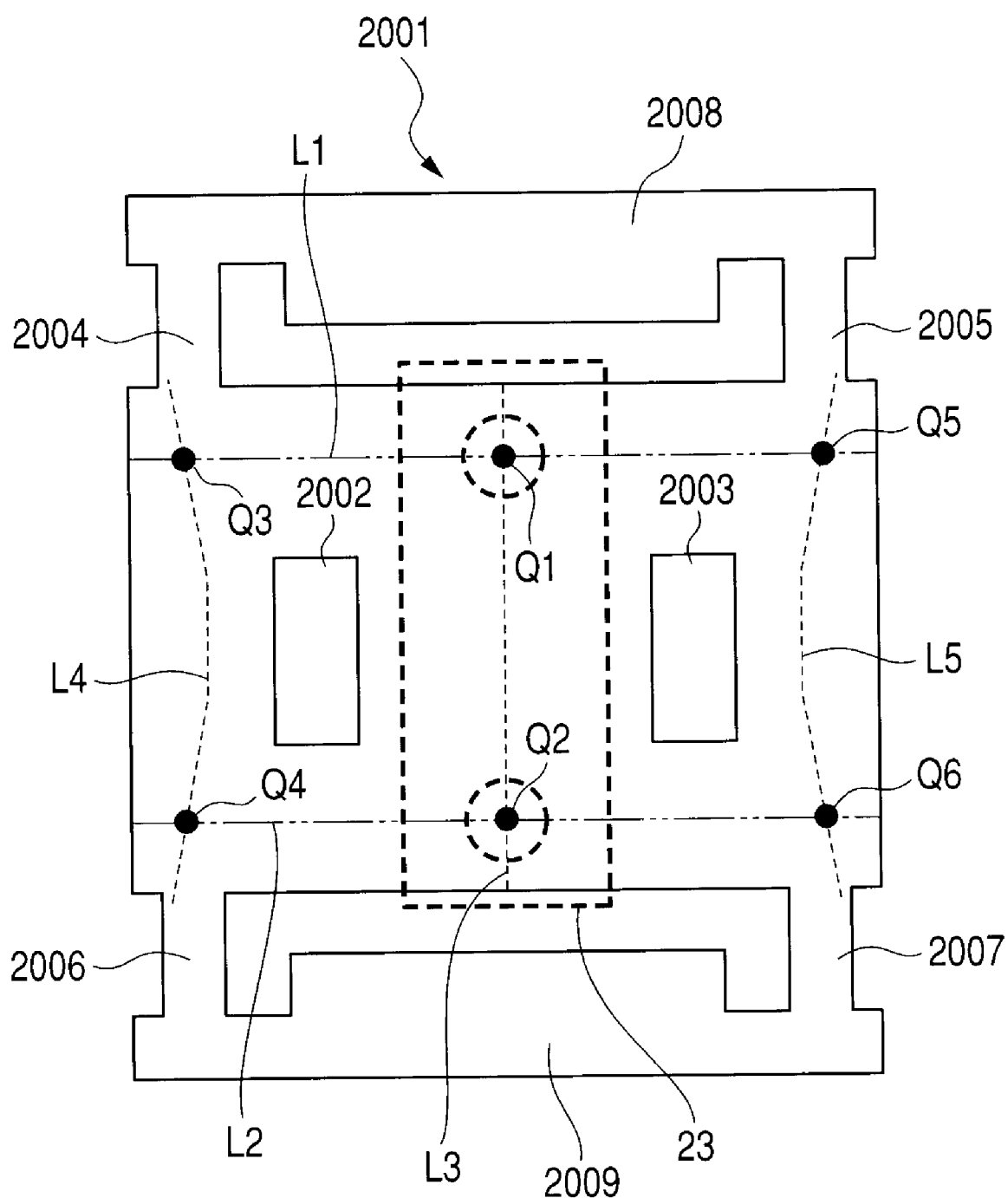
FIG. 12 is a drawing for describing the placement point of the damping member in the ultrasonic motor of Example 1 of the present invention.

FIG. 12 is a drawing for describing the placement point of the damping member in the ultrasonic motor of this Example.

Figure 13A:
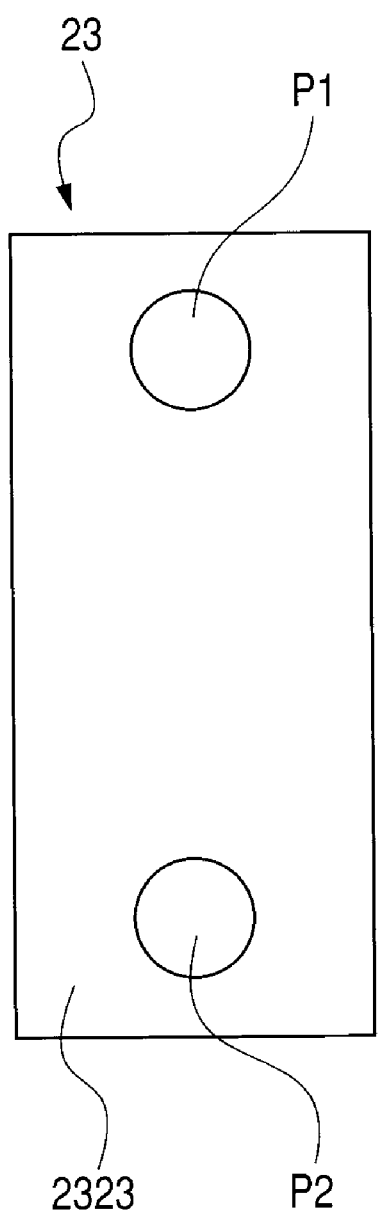
FIGS. 13A and 13B are drawings for describing the constitution of the damping rubber in the ultrasonic motor of Example 1 of the present invention.
Figure 13B:
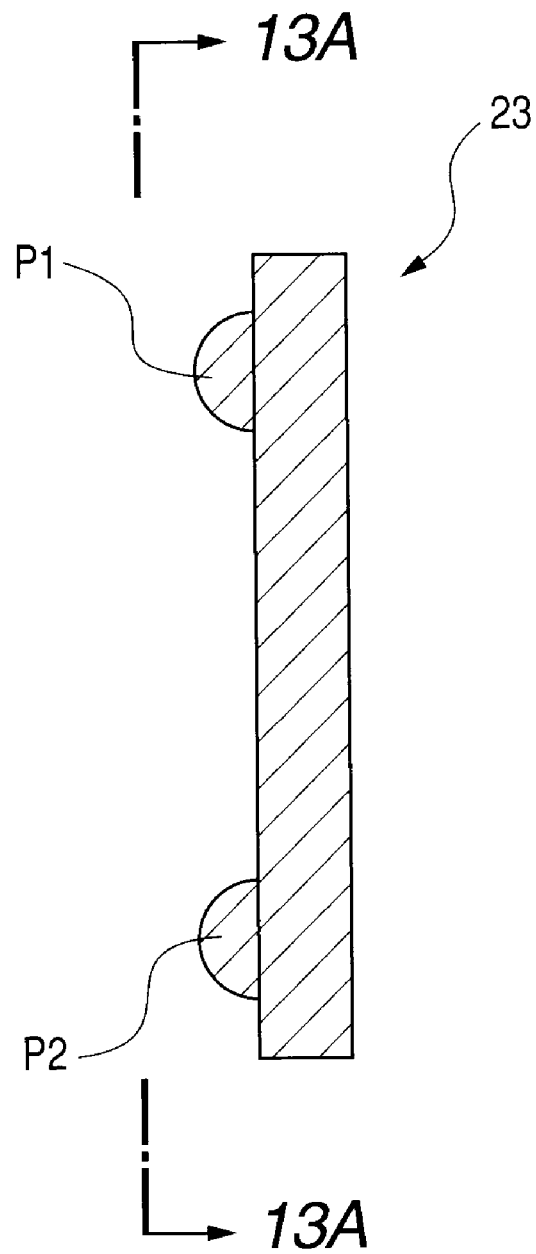

FIGS. 13A and 13B are drawings for describing the constitution of the damping rubber in the ultrasonic motor of this Example 1.

Figure 14:
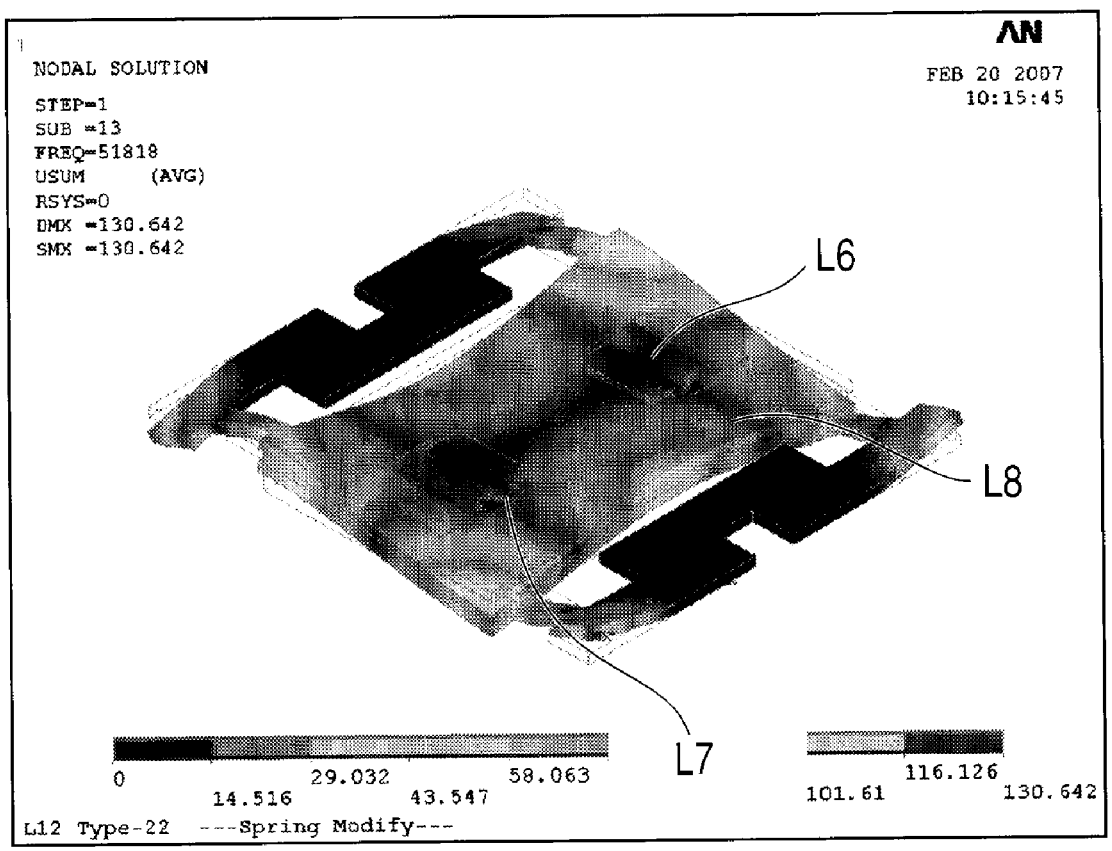
FIG. 14 is a drawing for describing an undesired mode to be damped in the ultrasonic motor in Example 1 of the present invention.
Figure 15:
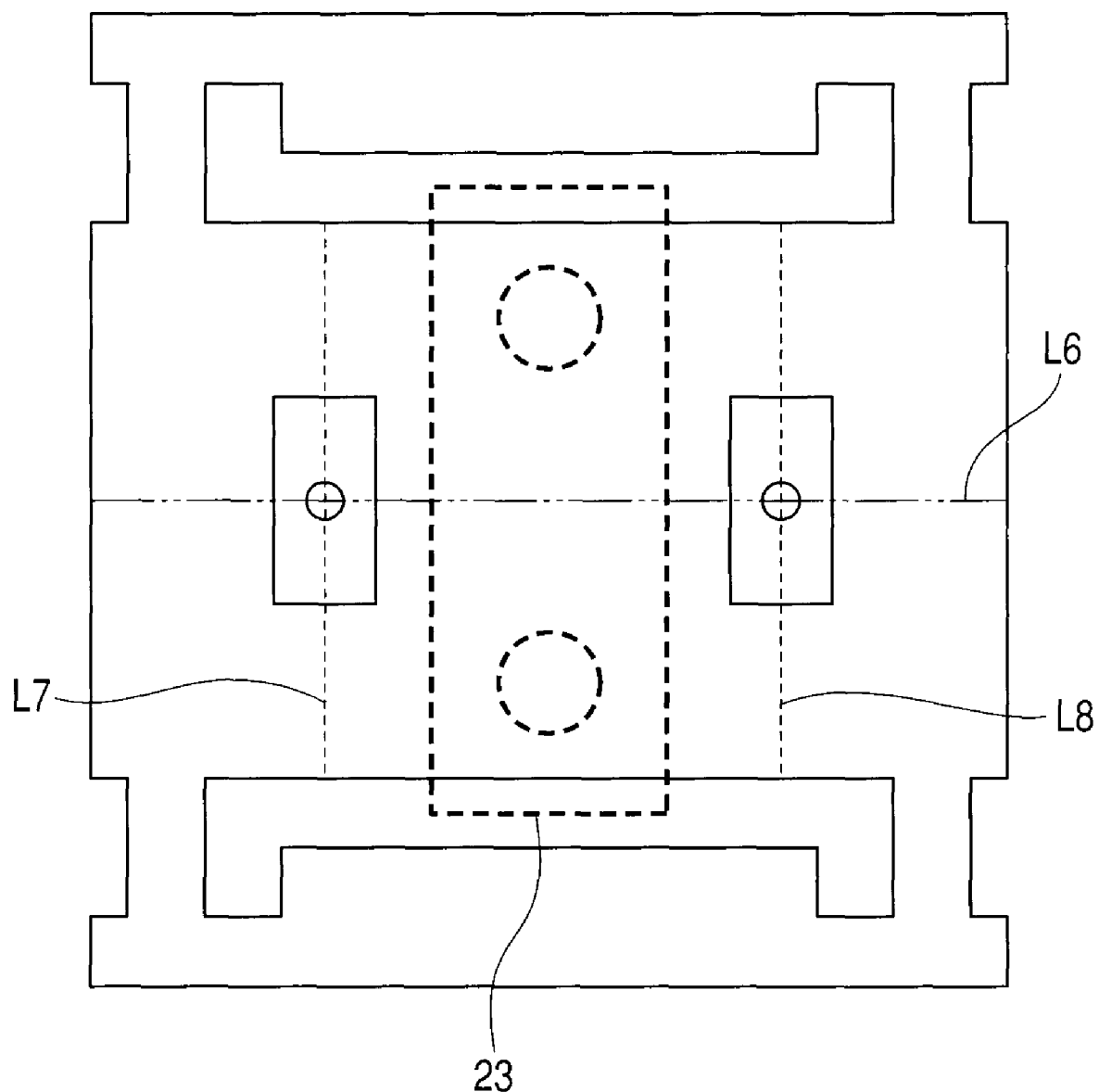
FIG. 15 is a drawing for describing an undesired mode to be attenuated in the ultrasonic motor in Example 1 of the present invention.

FIGS. 14 and 15 are drawings for describing an undesired mode to be damped in the ultrasonic motor in this Example.

The ultrasonic motor of this Example has a vibration plate 20, as illustrated in FIGS. 9A and 9B, made of an iron type metal (e.g., SUS420j2) worked by a press or the like in a shape illustrated in FIGS. 10 to 12.

Friction-contacting protrusions 2002, 2003 are formed near the center of the main body 2001 of vibration plate 20 as illustrated in FIG. 12.

Fixation portions 2008, 2009 are connected to the main body 2001 of the vibrating plate through support portions of two sets (2004, 2005; and 2006, 2007) stretching out from the four corners of main body 2001.

Piezo-electric element 21 is bonded by an adhesive or the like onto the reverse face of the main body 2001 of the vibration plate. A power-supplying flexible substrate (not shown in the drawing) is joined to the electrode face of this piezo-electric element to provide a vibrator 22.

Vibrator 22 is fixed to holder 24 having fixation portions 2008, 2009 formed from a resin or the like and is joined to a carriage or the like not shown in the drawing.

Driven member 25 in contact with vibrator 22 is made of a magnetic material, and is treated for abrasion resistance at the face in contact with vibrator 22.

This rail-shaped driven member 25 is fixed at both ends to the casing. Vibrator 22 comprised of a magnetic material is in pressure contact with driven member 25 by the attraction force of this magnet.

When an electric field is applied to vibrator 22 from a power source not shown in the drawing through the power-supplying flexible substrate, two bending vibrations are excited in vibrator 22 as illustrated in FIGS. 10 and 11.

FIG. 10 illustrates deformation state in a pushing-up vibration mode in the direction perpendicular to the face: one of the stationary vibration modes of bending vibration of main body 2001 of the vibration member. In FIG. 10, the displacement by the bending vibration is the largest at the middle portion of the main body of the vibration member (the amplitude of the vibration being largest). This position is called a loop of the vibration. In FIG. 10, at the portions L1 and L2, the vibration displacement is nearly zero. This position is generally called a node. The node in a point is called a nodal point. In the vibration of a rectangular plate as in this Example, the node is formed in a line, not a point. Such a linear node is called a nodal line in the present invention. When the vibration plate is a disk, the nodal lines formed in the radius direction are concentric: this nodal line is called a nodal circle.

FIG. 11 illustrates another stationary wave vibration mode formed in the main body of the vibration member. The nodal lines L3-L5 are formed in the direction perpendicular to the aforementioned nodal lines L1 and L2.

By superposition of the above two vibration modes at a phase difference $\pi/2$ with time, the friction-contacting protrusions 2002, 2003 are driven in ellipsoidal movement to drive vibrator 22 and holders 24 connected thereto relatively to driven member 25.

As described above, the linear ultrasonic vibrator of this Example drives the driven member 25 in contact with the contact member of the vibrator by causing an ellipsoidal movement of the vibrator having the piezo-electric element and the contact member.

The linear ultrasonic motor constituted as above can frequently cause creak or a like noise owing to the driving by friction as mentioned above.

The creak (noise) is found to be caused by generation of undesired vibration mode (vibration as illustrated in FIG. 14 in this Example) other than the vibration mode for the motor driving. The undesired vibration mode generates a creak as the difference between the inherent frequency of the undesired vibration and the frequency for driving.

Therefore, in this Example, to prevent the generation of such a creak, a vibration-damper is placed between the support and the vibrator to damp effectively the undesired vibration mode without retarding the driving mode.

FIG. 12 shows the point where the damper is to be placed.

Being obvious from the vibration mode illustrated in FIG. 10, six nodes common to the two driving modes exist at the intersection points (Q1-Q6) of L1-L2, and L3-L5.

On the other hand, the undesired mode to be damped has three nodal lines (L6-L8) as illustrated in FIGS. 14 and 15.

These nodal lines do not precisely coincide with the above-mentioned points Q1-Q6. Therefore the damping at any of the points can achieve the damping effect correspondingly.

However, in this Example, for effective damping of the undesired vibration, the points Q1 and Q2 where the undesired vibration amplitudes are larger are selected out of the six points Q1-Q6. Thereon the vibration damper 23 is placed.

FIGS. 13A and 13B illustrate the shape of the vibration damper 23.

As illustrated in FIGS. 13A and 13B, two hemispherical protrusions (P1-P2) are formed on flat plate-shaped base 2323. This damper can be made of a high-damping material such as an elastic rubber (butyl rubber) and a high-damping elastomer.

Protrusions P1, P2 are formed respectively at the positions corresponding to the above-mentioned Q1, Q2. This vibration damper 23 is held between holder 24 and vibration member 22 to bring the above-mentioned two points of the piezo-electric element face into contact with P1 and P2. Thereby the above-mentioned creaking noise can be prevented effectively.

Example 2

In this Example 2, another constitution of a linear type ultrasonic motor is described which is different from the one of Example 1.

Figure 16A:
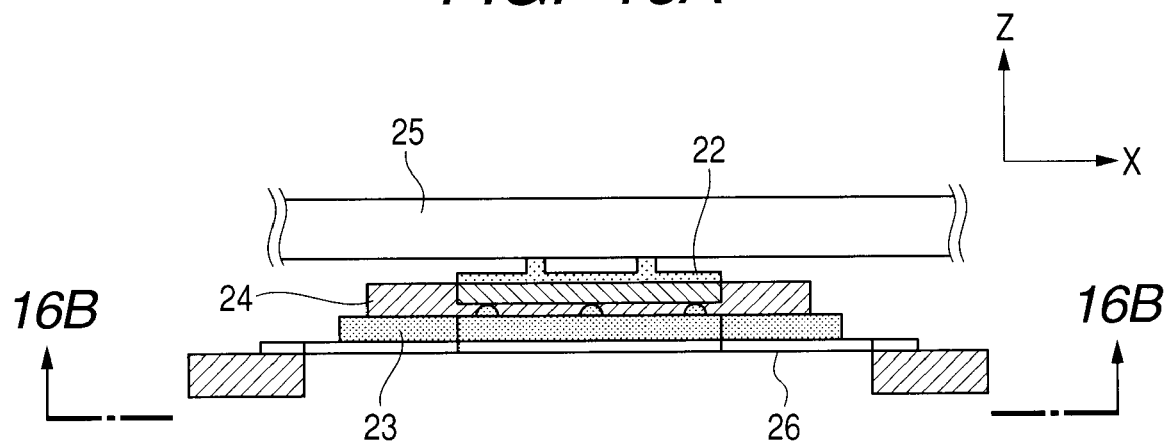
FIGS. 16A and 16B are respectively a sectional view and a bottom view for describing the ultrasonic wave motor of example 2 of the present invention.
Figure 16B:
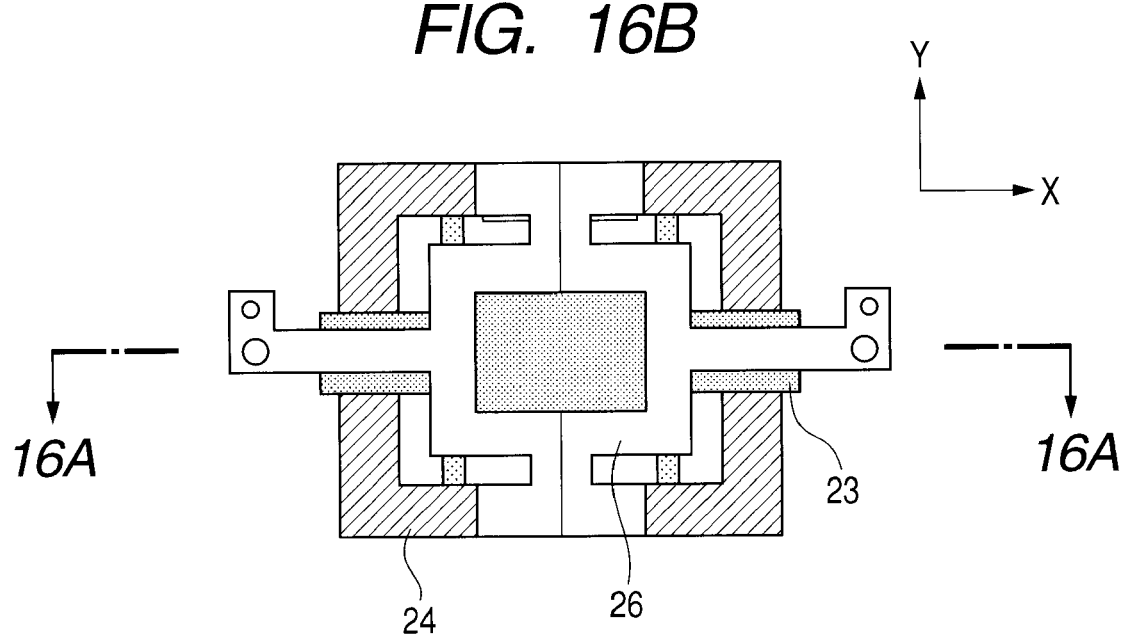

FIGS. 16A and 16B are respectively a sectional view and a bottom view for describing the ultrasonic wave motor of Example 2 of the present invention.

In this Example, the vibration member is driven in contact with a slider as the driven member. Therefore, these are supported by equalizing spring 26 for keeping the contact state stably over the large span.

Equalizing spring 26 restricts the freedom of the vibration member in the Y-direction in the drawing, and has a small rigidity not to affect the pressing force exerting the vibration member and the slider for the freedom around the X-axis and Y-axis.

Therefore, equalizing spring 26 is usually in a shape of a thin plate. This tends to cause a noise owing to many kinds of resonance modes of this plate spring.

To solve the above problems, in this Example, one face of the damping rubber as the vibration-damping member is joined to the equalizing spring, and protrusions formed on the other face are brought into contact with the points corresponding to Q1-Q6.

This structure prevents generation of undesired mode causing creak and eliminates generation of a noise excited in the equalizing spring during the driving.

Example 3

In this Example 3, the damping rubber as the vibration damping member is shaped in integration with the equalizing spring.

Figure 17A:
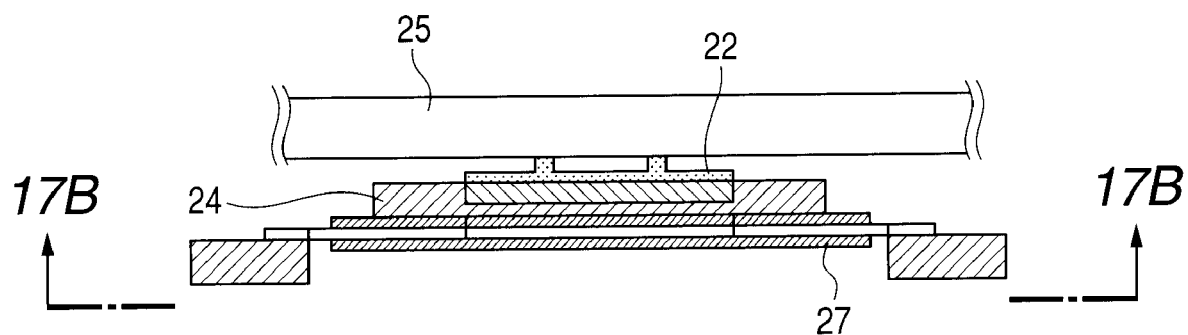
FIGS. 17A and 17B are respectively a sectional view and a bottom view for describing the ultrasonic wave motor of example 3 of the present invention.
Figure 17B:
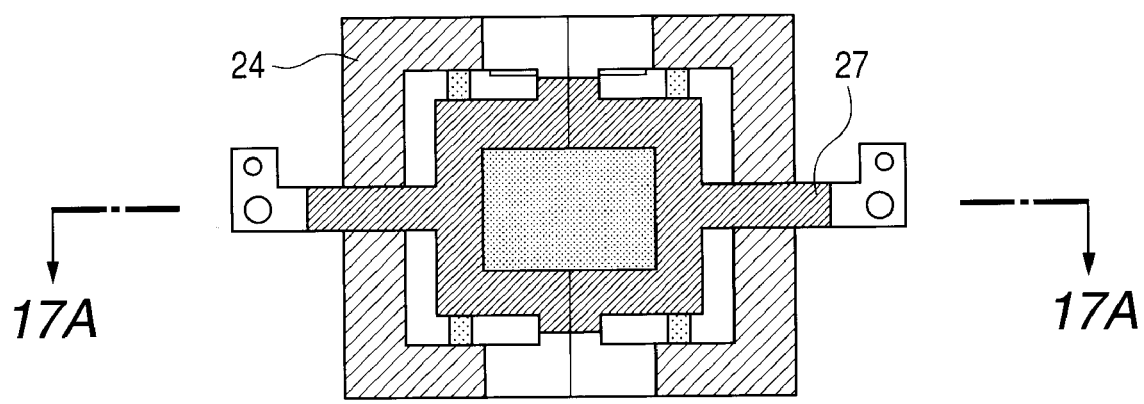

FIGS. 17A and 17B are respectively a sectional view and a bottom view for describing a constitution of an ultrasonic motor of this Example.

In the ultrasonic motor of this Example, the entire of the equalizing spring is coated with a butyl rubber having a high damping coefficient by outsert molding as illustrated in FIGS. 17A and 17B. At the positions of the nodes Q1 and Q2 of the vibrator, projections in the same shape as the aforementioned protrusions are formed similarly in integration.

The coating of the entire of the equalizing spring with rubber strengthens the adhesion between the rubber and the spring to improve remarkably the damping effect on the spring and the reliability to achieve more stable noise reduction effect.

Example 4

In this Example 4, the pressure spring is constituted as the pressure-applying unit for pressure contact of the vibration-damping member with vibration member 22 and slider 25 at the common nodes.

Figure 18A:
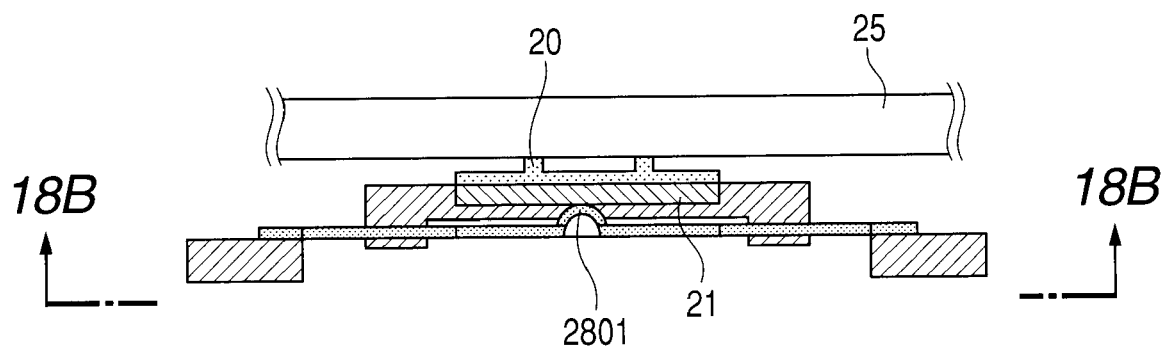
FIGS. 18A and 18B are respectively a sectional view and a bottom view for describing the ultrasonic wave motor of example 4 of the present invention.
Figure 18B:
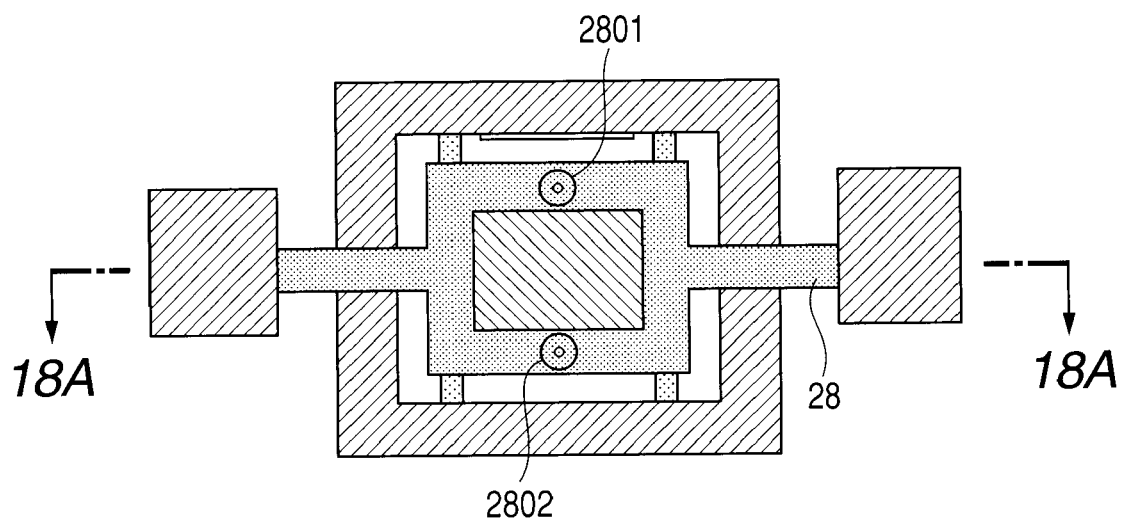

FIGS. 18A and 18B are respectively a sectional view and bottom view for describing the constitution of the ultrasonic motor of this Example.

In this Example, plate-shaped pressure spring 28 is fixed at the both ends to a part of the main body like the carriage. Two protrusions 2801, 2802 provided near the center thereof are in direct contact with the piezo-electric element portion of vibration member 22 to apply a pressure to the vibration member.

The positions of the contact of the two protrusions 2801, 2802 coincide with the positions of common nodes Q1 and Q2 onto which the damping member is brought into contact in the above Example.

As described above, application of a pressing force by direct contact of a pressurizing unit with the common nodes in the vibration member enables extreme decrease of a loss (supporting loss) caused by restriction of the vibration of the driving member and suppression of undesired mode only.

Example 5

In this Example 5, the protrusions of the pressing member in Example 4 are provided separately from the pressure spring (protrusions 29).

Figure 19A:
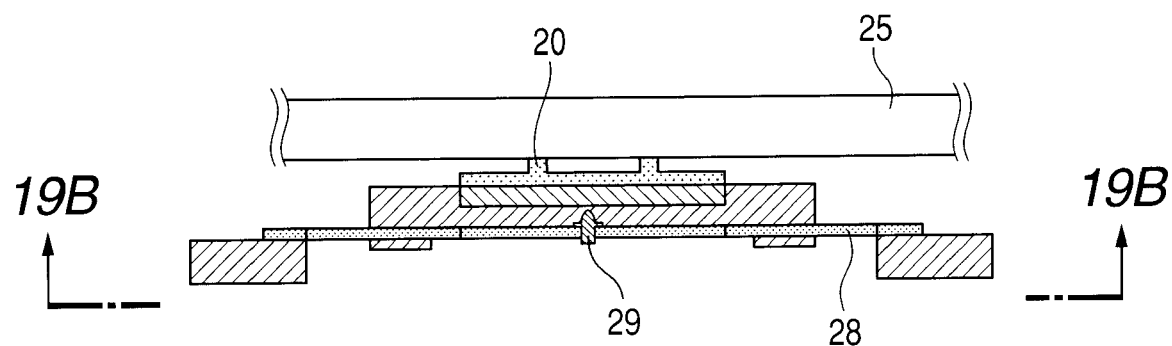
FIGS. 19A and 19B are respectively a sectional view and a bottom view for describing the ultrasonic wave motor of example 5 of the present invention.
Figure 19B:
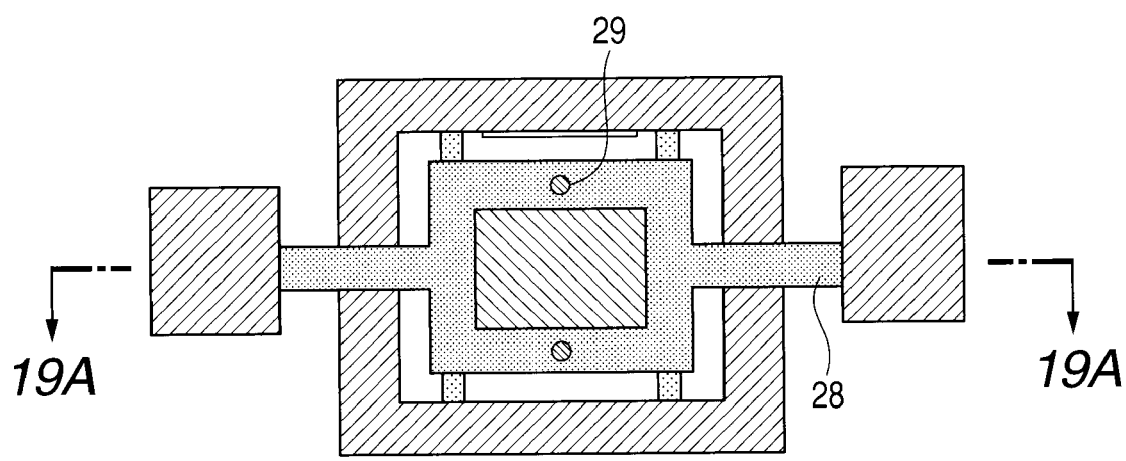

FIGS. 19A and 19B are respectively a sectional view and a bottom view for describing the constitution of the ultrasonic motor of this Example.

According to this Example, protrusions 29 have respectively a sharp tip for contact with piezo-electric element 21 of the vibration member. Thereby the area of contact of the protrusion with the portion Q1 or Q2 is extremely small (nearly a point) to decrease the adverse effect on the driving mode.

Example 6

In this Example 6, the force of contact between pressing protrusion 29 and piezo-electric element 21 is strengthened in the driving force generating direction (perpendicular to the pressing direction). The driving force is transmitted through the protrusions 29 as described below.

Figure 20A:
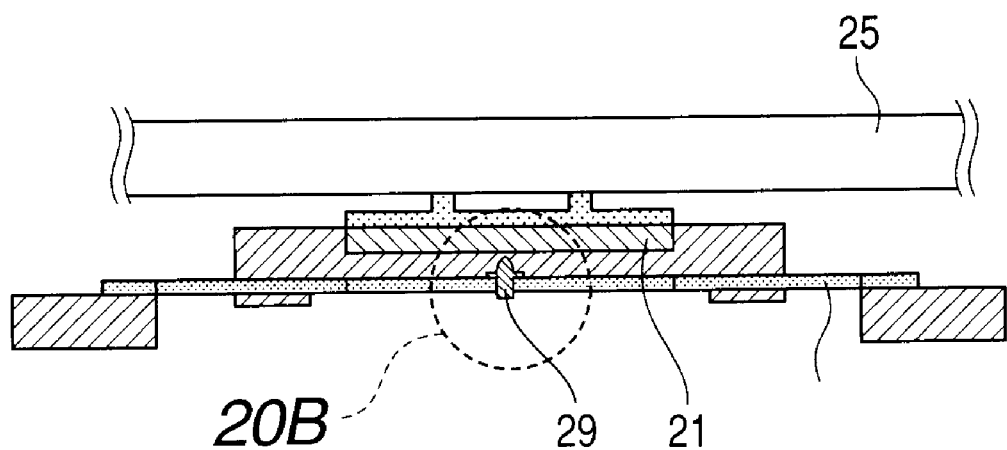
FIGS. 20A and 20B are respectively a sectional view and a bottom view for describing the ultrasonic wave motor of example 6 of the present invention.
Figure 20B:
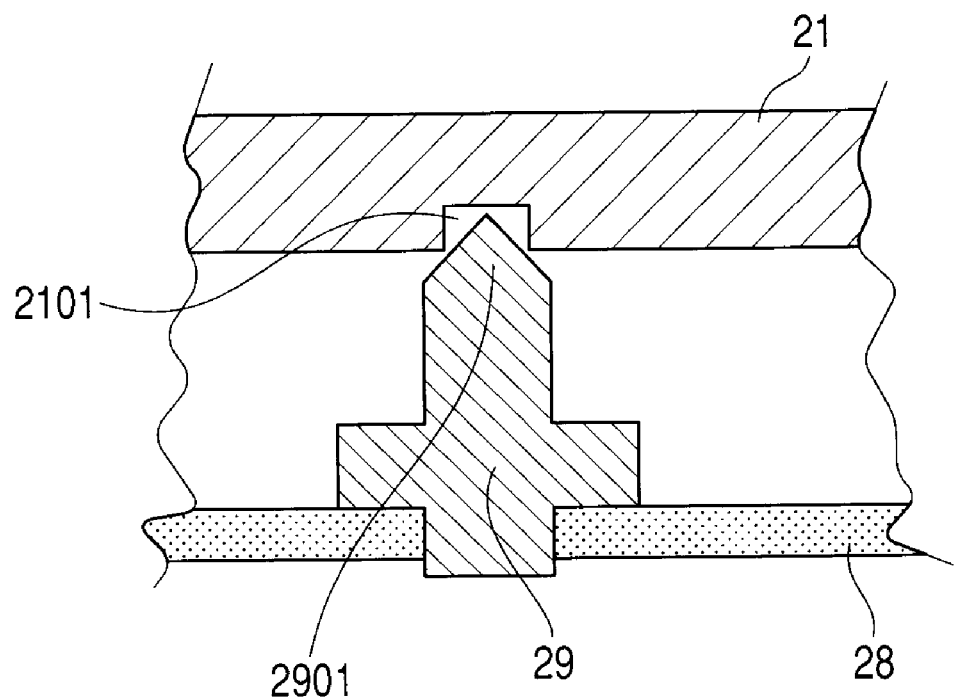

FIGS. 20A and 20B are respectively a sectional view and an expanded view for describing the constitution of the ultrasonic motor of this Example.

In this Example, holes 2101 of a depth of 0.2-0.3 mm, for example, are formed at the positions corresponding to the positions Q1 and Q2 of piezo-electric element 21. The tips 2901 of protrusions 29 are engaged with the holes.

With this constitution, the pressing force is applied by pressure spring 28 and protrusion 29 without adverse effect on the driving vibration mode, and driving force can be transmitted through these members to the carriage or other portion of the main body. Thereby the structure can be simplified.

Example 7

In this Example 7, the vibration damper is constituted from a member for transmitting the driving force between the vibrator and the driven member.

Figure 21A:
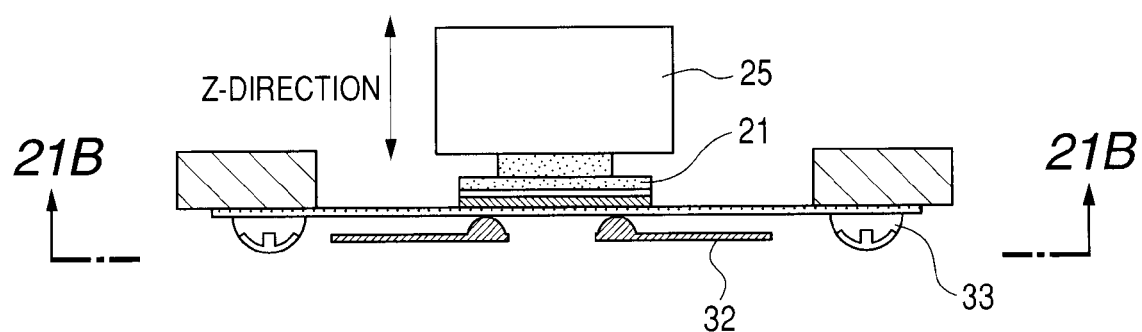
FIGS. 21A and 21B are respectively a sectional view and a bottom view for describing the ultrasonic wave motor of example 7 of the present invention.
Figure 21B:
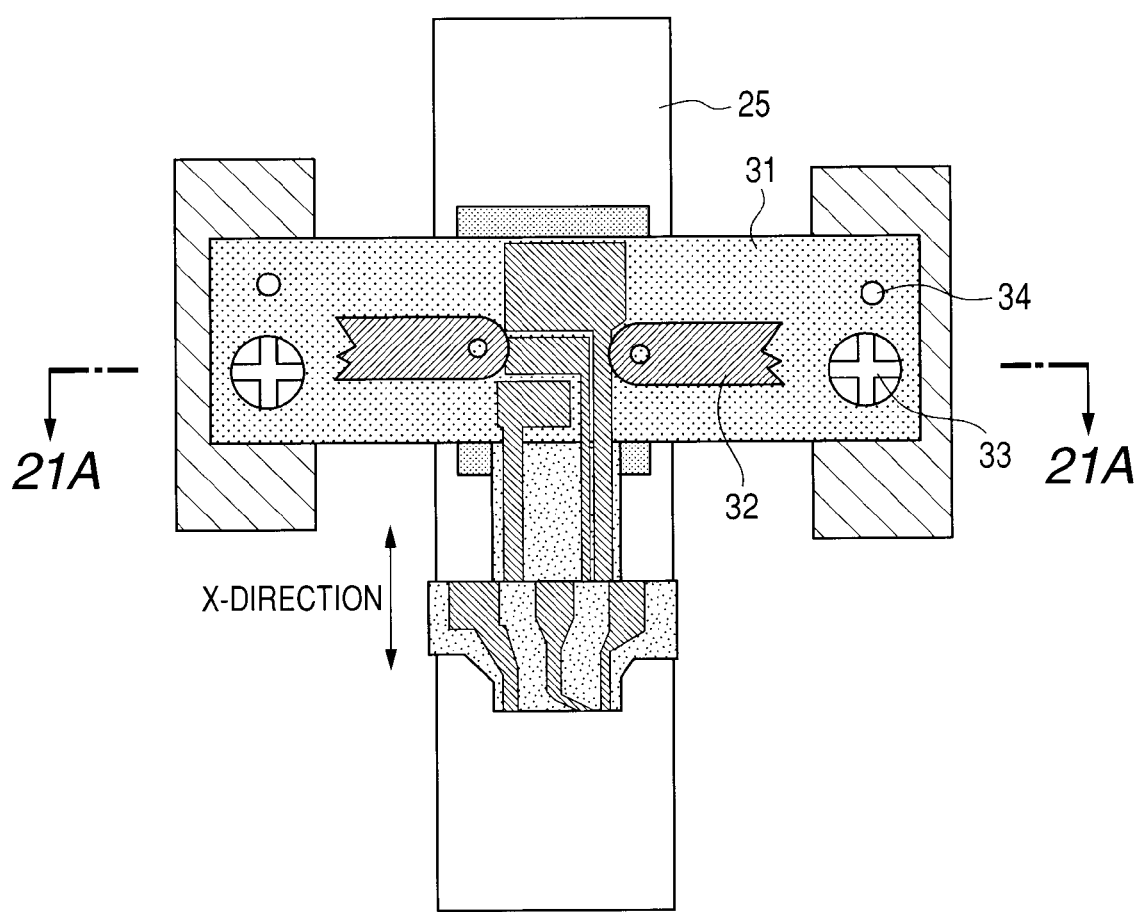
Figure 22:
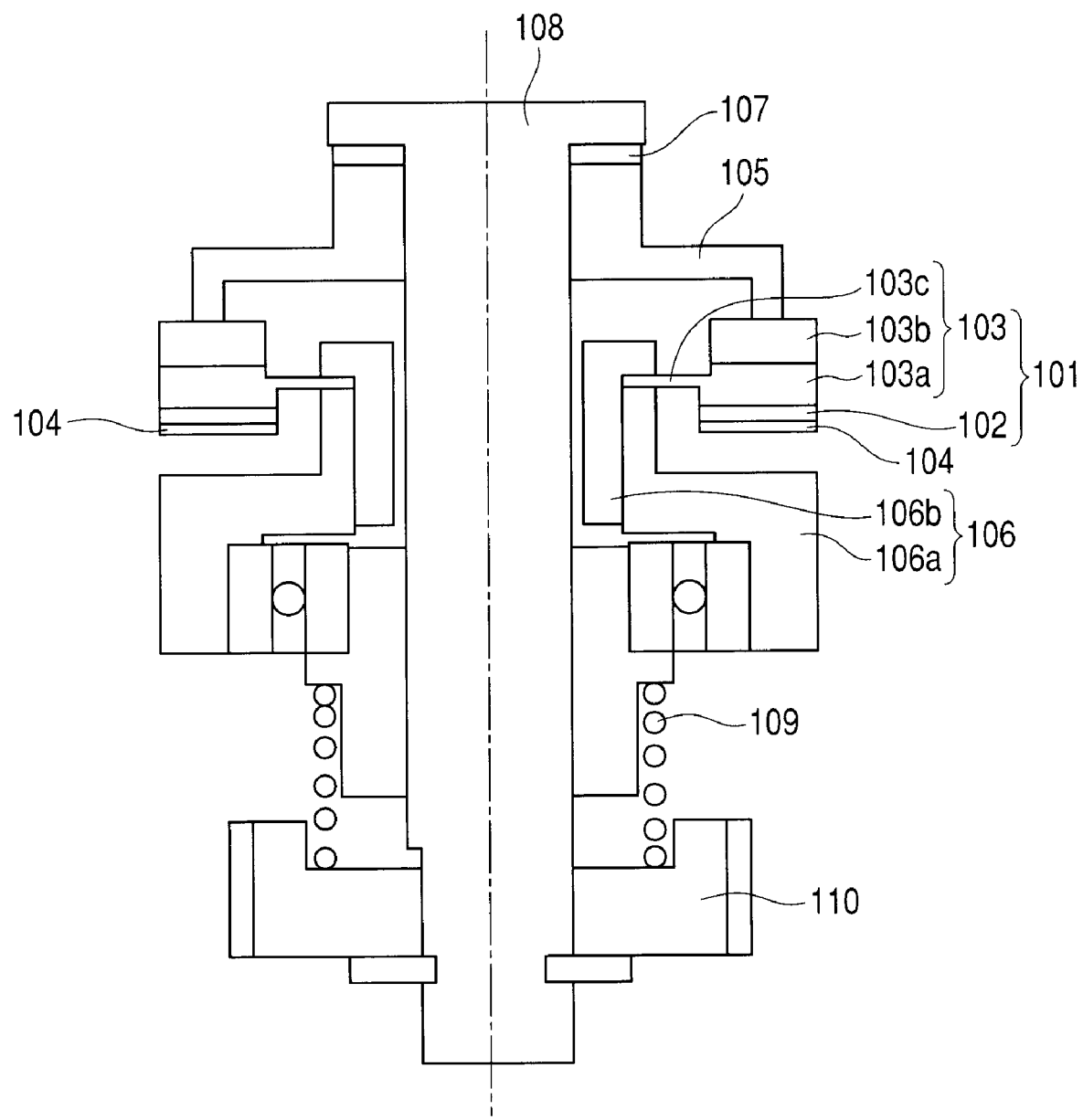
FIG. 22 is a drawing for describing a conventional ultrasonic motor described in Patent Document 3.
Figure 23:
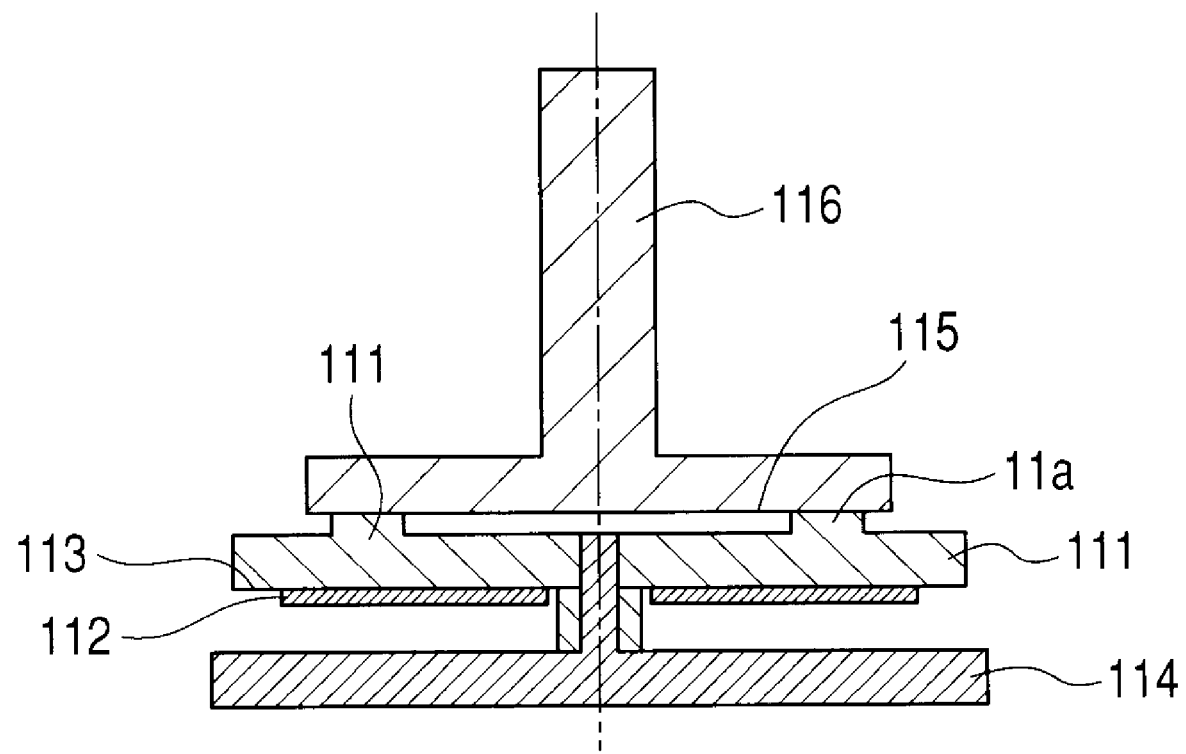
FIG. 23 is a drawing for describing a conventional ultrasonic motor described in Patent Document 4.

FIGS. 21A and 21B are respectively a sectional view and a bottom view for describing the constitution of the ultrasonic motor of this Example.

In this Example, power feeder 31 (flexible printed substrate, hereinafter referred to as a flexible substrate) is connected to piezo-electric element 21 joined to the vibrator, and is fixed by screws 33 to a fixation member at the both sides.

The fixation member has positioning pins 34 for positioning the flexible substrate to decide precisely the fixation position of the vibrator joined to the flexible substrate.

This flexible substrate is pressed by pressure spring 32 at the back face. The hemispherical tip of the spring presses the common nodes Q1 and Q2 of the driving mode of the vibrator at a prescribed pressure.

The aforementioned flexible substrate 31, which has a base formed from a thin resin such as a polyimide, has an extremely low rigidity in the pressing direction (Z-direction) to exhibit tractability to the sliding face of slider 25.

On the other hand, the flexible substrate has a large width to have a high bending rigidity in the driving direction (X-direction) to transmit effectively the driving force.

Therefore, the flexible substrate serves as the power feeder, and has a function of supporting the vibrator and a function of outputting the transmission.

In the present invention as described above, the vibration damper is attached to the point of common node of the stationary vibrations for the driving where the undesired vibration has a large vibration amplitude.

In other words, a damping member as a vibration-restricting member or a pressing member is attached to a point of a node common to the driving modes but a loop (a point of a larger vibration amplitude) of an undesired vibration to damp only the undesired mode.

As described above, a creak or a like noise can be reduced effectively without lowering the efficiency of the motor.

In the above Examples, the projection of the damper is hemispherical, but the shape of the projection is not limited naturally thereto insofar as the damper comes to contact with the node of the vibrator at a smaller contact area: for example, a conical shape.

Similarly, the tip of the contact portion (2801, 2802, 29) is not limited to be hemispherical or conical in the shape, but may be any shape having a sharp tip to have a contact area as small as possible.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-230891 filed Sep. 9, 2008 and 2008-335545 filed Dec. 27, 2008, which are hereby incorporated by reference herein in their entirety.

What is claimed is:

1. A vibration wave driving device having a vibrator comprised at least of a piezo-electric element and a contact member capable of causing an ellipsoidal movement by synthesis of plural stationary wave vibrations, and a supporting member for supporting the vibrator, the vibration wave driving device for driving a driven member in contact with the contact member of the vibrator by ellipsoidal movement of the vibrator, the vibration wave driving device comprising:

a vibration-preventing member attached to a node other than a support portion of the vibrator supported by the supporting member, among common nodes of intersection of nodal lines of the plural stationary wave vibrations excited in the vibrator.

2. The vibration wave driving device according to claim 1, wherein the vibration-preventing member is comprised of a vibration-damping member.

3. The vibration wave driving device according to claim 2, wherein the vibration-damping member has a shape for nearly point contact with the vibrator.

4. The vibration wave driving device according to claim 3, wherein the portion of the vibration-damping member in contact with the vibrator has a shape of a hemisphere or circular cone.

5. The vibration wave driving device according to claim 2, wherein the vibration-damping member is comprised of an elastic rubber or an elastomer having a high damping property.

6. The vibration wave driving device according to claim 1, wherein the vibration-preventing member is comprised of a pressure-applying unit for pressure contact between the vibrator and the driven member.

7. The vibration wave driving device according to claim 1, wherein the vibration-preventing member is comprised of a transmission member for transmitting the driving force generated between the vibrator and the driven member.

8. The vibration wave driving device according to claim 1, wherein the supporting member supports the vibrator from a side of the piezo-electric element, and wherein the vibration-preventing member is provided between the supporting member and the vibrator.

* * * * *